US012734655B2

(12) United States Patent
Hu

(10) Patent No.: US 12,734,655 B2
(45) Date of Patent: Sep. 15, 2026

(54) DIGITALLY DISPLAYING TORQUE WRENCH WITH MECHANICAL TORQUE ADJUSTMENT

(71) Applicant: Bobby Hu, Taichung City (TW)

(72) Inventor: Bobby Hu, Taichung City (TW)

( * ) Notice: Subject to any disclaimer, the term of this patent is extended or adjusted under 35 U.S.C. 154(b) by 493 days.

(21) Appl. No.: 18/287,740

(22) PCT Filed: May 31, 2021

(86) PCT No.: PCT/CN2021/097362

§ 371 (c)(1),
(2) Date: Aug. 2, 2024

(87) PCT Pub. No.: WO2022/252043

PCT Pub. Date: Dec. 8, 2022

(65) Prior Publication Data

US 2025/0326097 A1 Oct. 23, 2025

(51) Int. Cl.
*B25B 23/142* (2006.01)

(52) U.S. Cl.
CPC ...... *B25B 23/1427* (2013.01); *B25B 23/1425* (2013.01)

(58) Field of Classification Search
CPC ..... B25B 13/46; B25B 13/462; B25B 13/463; B25B 13/48; B25B 21/002; B25B 21/004; B25B 21/008; B25B 23/0028; B25B 23/14; B25B 23/141; B25B 23/142; B25B 23/1425; B25B 23/1427; B25B 23/16; G01L 25/00
See application file for complete search history.

(56) References Cited

U.S. PATENT DOCUMENTS

| | | | | |
|---|---|---|---|---|
| 3,964,351 A | | 6/1976 | Tsuji | |
| 6,119,562 A | * | 9/2000 | Jenkins | B25B 23/1427 81/479 |
| 2007/0227316 A1 | * | 10/2007 | Lucke | B25B 23/1425 81/478 |
| 2020/0398410 A1 | * | 12/2020 | Chiang | B25B 23/141 |

FOREIGN PATENT DOCUMENTS

| | | | |
|---|---|---|---|
| CN | 209632887 | U | 11/2019 |
| CN | 210210192 | U | 3/2020 |
| DE | 102006013147 | A1 | 9/2007 |
| DE | 202013101035 | U1 | 5/2013 |
| GB | 1436492 | A | 5/1976 |

* cited by examiner

*Primary Examiner* — Robert J Scruggs
(74) *Attorney, Agent, or Firm* — WPAT, PC

(57) ABSTRACT

A digitally displaying torque wrench with mechanical torque adjustment includes a main body, a wrenching device, a torque releasing device, a shaped elastic member, a torque adjusting device, and a torque sensing device. The torque adjusting device efficiently slides along a direction in parallel to an axis of the main body, so as to be operable by the user to adjust an axial position of a resting member of the torque adjusting device with respect to the shaped elastic member, thereby quickly adjusting the torque setting value of the wrench. Also, when the force transmission is stopped by the torque releasing device, the wrenching device provides a mechanical torque disengagement to notify the user of the force reaching the torque setting value.

19 Claims, 14 Drawing Sheets

DIGITALLY DISPLAYING TORQUE WRENCH WITH MECHANICAL TORQUE ADJUSTMENT

FIELD OF THE INVENTION

The present invention relates to torque wrenches, and more particularly, to a digitally displaying torque wrench with mechanical torque adjustment.

DESCRIPTION OF THE RELATED ART

US patent 2020/0398410A1 "Torque wrench" discloses a torque wrench. The torque wrench is a torque wrench which digitally displays the torque setting value, and comprises a main body, a driving part, a tripping mechanism, a torque assembly, and an adjustment assembly. The torque assembly comprises a bias member and a resist member. The adjustment assembly comprises a position limiting member, an adjusting member, and a sliding assembly. The position limiting member abuts against the bias member. The sliding assembly is fixed to the position limiting member. The adjusting member is allowed to adjust the sliding assembly to adjust the relative position of the position limiting member abutting against the bias member. Therein, when the driving part bears a torque greater than a predetermined torque value of the torque wrench, the tripping mechanism is separated from the resist member, thereby indicating that the torque of the user fastening the fastener reaches the predetermined value.

However, when the torque fastening the fastener reaches the predetermined value, due to the wrenching inertia of the user, the force will not be stopped immediately, so that during a few seconds at the moment, the user gripping the torque wrench will still impose an excessive torque to the fastener, causing the fastening torque value of the fastener to be inaccurate. Further, because the pivot member of the tripping mechanism is disposed in the base board, which is rigidly fixed in the main body, when the tripping mechanism trips, the pivot member does not hit the main body, failing to achieve the function of generating a hitting indication of a mechanical torque wrench to remind the user.

Also, referring to a torque wrench disclosed by German utility patent 202013101035U1 "Torque tool with trigger mechanism", another torque tool is provided, comprising a lever casing, a lever device, a trigger mechanism, and a torque adjusting device. The lever device is disposed in the lever casing and comprises two levers, which are releasably connected by a switching edge. When the head part bears a torque greater than the predetermined torque setting value, the two levers are released, notifying the user of that the torque setting value for fastening the fastener reaches the predetermined value.

SUMMERY OF THE INVENTION

Technical Issue

As mentioned above, due to the wrenching inertia of the user, when the torque fastening the fastener reaches the predetermined value, the user will still impose an excessive torque to the fastener, causing the fastening torque value of the fastener to be inaccurate. Also, when the two levers are released, because the lever in adjacent to the head part is biased by the bow spring and prevented from hitting the lever casing, and also prevented from achieving the function of generating a hitting indication of a mechanical torque wrench to remind the user.

Therefore, the present invention intends to provide an electronic torque wrench with obvious mechanical releasing function to meet the needs of consumers.

RESOLUTION TO THE ISSUE

Resolution to the Technical Issue

To improve the issues above, the present invention discloses a digitally displaying torque wrench with mechanical torque adjustment, which achieves the functions of mechanical torque releasing and quick adjustment of torque. Also, the torque setting value is digitally displayed by the displayer, achieving the function of an electronic torque wrench.

For achieving the aforementioned objectives, an embodiment of the present invention provides a digitally displaying torque wrench with mechanical torque adjustment, comprising a main body, a wrenching device, a torque releasing device, a shaped elastic member, a torque adjusting device, and a torque sensing device. The main body forms a first end and a second end away from the first end along an axis, the axis dividing the main body into a forward side and a reverse side, the main body comprising an inner wall, the inner wall comprising a first inner wall on the reverse side and a second inner wall on the forward side; the wrenching device swayable and disposed on the first end of the main body, the wrenching device comprising a wrenching member, a linkage bar, and an actuating member, the wrenching member pivotally disposed on the first end and comprising a wrenching end exposed from the main body and a distal end inserted into the main body, the linkage bar comprising a first combining end and an opposite second combining end, the first combining end pivotally disposed on the distal end, the actuating member pivotally disposed in the main body and operable between a first pivot position and a second pivot position with respect to the main body, whereby the actuating member is linked with the second combining end; the torque releasing device pivotally disposed in the main body and optionally abutting against one end of the wrenching device away from the wrenching end, and the torque releasing device abutting against the actuating member; the shaped elastic member comprising a fixing end, and the fixing end of the shaped elastic member fixed to the torque releasing device; the torque adjusting device disposed in the main body and movable along a direction in parallel to the axis of the main body to generate a relative sliding relationship, the torque adjusting device comprising a resting member upon which one end of the shaped elastic member away from the fixing end rests, the torque adjusting device being operable by a user to adjust an axial position of the resting member with respect to the shaped elastic member; and the torque sensing device disposed on a position of the main body corresponding to the torque adjusting device, the torque sensing device configured to sense a displacement variation of the torque adjusting device and display a torque setting value; when the actuating member is at the first pivot position, the actuating member transmits a counterforce of the wrenching device to the shaped elastic member; when the torque releasing device is disengaged, a force transmission of the digitally displaying torque wrench is stopped; and when the actuating member sways to the second pivot position, the actuating member carries the linkage bar to displace with respect to the main body and simultaneously actuates the wrenching member to hit the first inner wall while the actuating member hits the second inner wall.

In another embodiment of the present invention, the wrenching member comprises a first hitting face on one side of the distal end, and a first hitting space is formed between the first hitting face and the first inner wall; the actuating member comprises a second hitting face on one side thereof, and a second hitting space is formed between the second hitting face and the second inner wall; when the torque releasing device stops the force imposing operation of the digitally displaying torque wrench, the first hitting face enters the first hitting space to hit the first inner wall, and the second hitting face enters the second hitting space to hit the second inner wall.

In another embodiment of the present invention, when the digitally displaying torque wrench is in the normal status, an axial center line of the linkage bar includes a first angle with the axis, the second hitting face includes an impact angle with the axis, and the second combining end of the linkage bar is on the reverse side; when the torque releasing device stops the force imposing operation of the digitally displaying torque wrench, the axial center line of the linkage bar includes a second angle with the axis, wherein the first angle is larger than the second angle, the first angle is larger than the impact angle, and the first combining end of the linkage bar crosses over the axis of the main body, such that the first combining end and the second combining end are both on the reverse side of the main body.

In another embodiment of the present invention, an actuating end is disposed on one end of the actuating member away from the linkage bar; the torque releasing device comprises a releasing member; a pressing member is pivotally disposed on the wrenching device in opposite to the wrenching end; the pressing member has one side linked with the actuating end and another side resting upon the releasing member. When the force imposed wrenching the digitally displaying torque wrench increases to be equal to the torque setting value, the releasing member is disengaged with the pressing member, so as to stop the force imposing operation of the digitally displaying torque wrench. When the digitally displaying torque wrench is recovered to the normal status, the releasing member and the pressing member are automatically restored to the original abutting status. The pressing member comprises a first abutting portion, and one side of the releasing member away from the shaped elastic member comprises a second abutting portion to abut against the first abutting portion.

In another embodiment of the present invention, a recovering member is disposed between the actuating end of the actuating member and the pressing member; the recovering member normally maintains the abutting status of the pressing member and the releasing member. A bias spring is disposed between the wrenching member and the inner wall of the main body to provide a force for the wrenching member to be recovered to the normal status; the wrenching device further comprises two clamp boards. The second combining end of the linkage bar is pivotally disposed on one side of the two clamp boards, and the pressing member is pivotally disposed on another side of the two clamp boards. Also, the actuating member is pivotally disposed between the two clamp boards. The actuating end of the actuating member comprises a first limiting portion, and the pressing member comprises a corresponding second limiting portion, wherein the first limiting portion and the second limiting portion are allowed to abut against each other, so as to limit the swaying degree of the pressing member.

In another embodiment of the present invention, the torque adjusting device comprises a moving member, a transmission gear, and an adjusting member. The moving member is allowed to be slidably disposed in the main body along the direction of the axis, with the resting member rotatably disposed in the moving member. Also, the moving member comprises a first tooth portion disposed along the direction in parallel to the axis, the transmission gear comprises a second tooth portion, the second tooth portion is engaged with the first tooth portion, and the adjusting member is connected with the transmission gear, such that the user rotates the adjusting member to carry the moving member to generate a linear displacement with respect to the main body and adjust the position of the resting member with respect to the shaped elastic member. The adjusting member is rotatably disposed on the main body along a direction of a rotation axis in perpendicular to the axis, and the second tooth portion is disposed about the rotation axis. The main body comprises a containing space, with a guiding portion disposed in the containing space. The moving member is slidably disposed in the main body along the guiding portion. The transmission gear defines a first rotation radius, the second tooth portion is disposed along the first rotation radius, the adjusting member defines a second rotation radius, the second rotation radius is larger than the first rotation radius, and the transmission gear and the adjusting member are disposed in a coaxial arrangement.

In another embodiment of the present invention, the torque sensing device comprises a sensing member and a displayer. The displayer is electrically connected with the sensing member, the sensing member comprises a movable portion, and the movable portion is connected with the moving member to move along with it, such that the sensing member senses the displacement variation of the moving member to generate a torque signal, according to which the displayer displays the torque setting value.

In another embodiment of the present invention, the torque sensing device comprises a sensing member, a sensed member, and a displayer. The displayer is electrically connected with the sensing member, and the sensed member is disposed on the moving member to move along with it, such that the sensing member senses the displacement variation of the sensed member in a non-contact sensing manner to generate a torque signal, according to which the displayer displays the torque setting value.

In another embodiment of the present invention, the main body comprises a sensing hole in communication with the containing space, and the sensing member senses the displacement variation of the moving member through the sensing hole. The torque sensing device further comprises a casing and a circuit board, a power source, and a counter disposed on the casing. Also, the displayer, the sensing member, the power source, and the counter are electrically connected with the circuit board. The counter is configured to, according to an amount of disengagement between the releasing member and the pressing member, send a counter signal to be displayed on the displayer. The wrenching device comprises a driver, the wrenching end is disposed on the driver, and the driver is removably disposed on the wrenching member. The torque sensing device further comprises a wireless transmission unit, which transmits the torque signal and the counter signal to a portable device. The main body further comprises a handle mounted around the second end.

For achieving the aforementioned objectives, another embodiment of the present invention provides a digitally displaying torque wrench with mechanical torque adjustment, comprising a main body, a wrenching device, a torque releasing device, a shaped elastic member, a torque adjusting device, and a torque sensing device. The main body forms a first end and a second end away from the first end along an axis, the axis dividing the main body into a forward side and a reverse side; the wrenching device swayable and disposed on the first end of the main body, the wrenching device comprising a wrenching end exposed from the main body; the torque releasing device pivotally disposed in the main body and optionally abutting against one end of the wrenching device away from the wrenching end; the shaped elastic member comprising a fixing end, the fixing end of the shaped elastic member fixed to the torque releasing device, the shaped elastic member comprising a shaped supporting section on one end thereof away from the fixing end, the shaped supporting section comprising a curve contact area, the shaped elastic member disposed in the main body and tilting with respect to the axis of the main body, an axial center line of the shaped elastic member including a tilt angle with the axis, the fixing end of the shaped elastic member arranged on the reverse side of the main body, the shaped supporting section of the shaped elastic member allowed to cross over the axis of the main body to be on the forward side of the main body; the torque adjusting device disposed in the main body and movable along a direction in parallel to the axis of the main body to generate a relative sliding relationship, the torque adjusting device comprising a resting member upon which the curve contact area of the shaped supporting section rests, the torque adjusting device operable by an user to adjust an axial position of the resting member with respect to the shaped supporting section, thereby changing the tilt angle of the shaped elastic member with respect to the main body; and the torque sensing device disposed in the main body corresponding to the torque adjusting device, the torque sensing device configured to sense a displacement variation of the torque adjusting device to display a torque setting value; when the resting member of the torque adjusting device rests upon the shaped elastic member away from the fixing end, the torque setting value is set at a minimum value; when the resting member of the torque adjusting device rests upon the shaped elastic member in adjacent to the fixing end, the torque setting value is set at a maximum value.

In another embodiment of the present invention, the curve contact area is formed in a shape which is thinner on two ends and thicker in the middle, so that the torque/distance curve of the digitally displaying torque wrench is presented in an approximate straight line.

In another embodiment of the present invention, the torque releasing device comprises a releasing member; a pressing member is pivotally disposed on the wrenching device in opposite to the wrenching end, and the pressing member rests upon the releasing member; when the force imposed wrenching the digitally displaying torque wrench continuously increases to be equal to the torque setting value, the releasing member is disengaged with the pressing member to stop the force imposing operation of the digitally displaying torque wrench; when the digitally displaying torque wrench is recovered to the normal status, the releasing member and the pressing member are restored to the original abutting status. The pressing member comprises a first abutting portion, and one side of the releasing member away from the shaped elastic member comprises a second abutting portion to abut against the first abutting portion. When adjusting the axial position of the resting member with respect to the shaped supporting section, the contact area of the first abutting portion and the second abutting portion is changed.

In another embodiment of the present invention, a recovering member is disposed between the wrenching device and the pressing member; the recovering member normally maintains the abutting status of the pressing member and the releasing member. A bias spring is disposed between the wrenching device and an inner wall of the main body to provide a force for the wrenching device to be recovered to the normal status; the wrenching device comprises a first limiting portion away from the wrenching end, and the pressing member comprises a corresponding second limiting portion, wherein the first limiting portion and the second limiting portion are allowed to abut against each other, so as to limit the swaying degree of the pressing member.

In another embodiment of the present invention, the torque adjusting device comprises a moving member, a transmission gear, and an adjusting member. The moving member is allowed to be slidably disposed in the main body along the direction of the axis, with the resting member rotatably disposed in the moving member. Also, the moving member comprises a first tooth portion disposed along the direction in parallel to the axis, the transmission gear comprises a second tooth portion, the second tooth portion is engaged with the first tooth portion, and the adjusting member is connected with the transmission gear, such that the user rotates the adjusting member to carry the moving member to generate a linear displacement with respect to the main body and adjust the position of the resting member with respect to the shaped supporting section. The adjusting member is rotatably disposed on the main body along a direction of a rotation axis in perpendicular to the axis, and the second tooth portion is disposed about the rotation axis. The main body comprises a containing space, with a guiding portion disposed in the containing space. The moving member is slidably disposed in the main body along the guiding portion. The transmission gear defines a first rotation radius, the second tooth portion is disposed along the first rotation radius, the adjusting member defines a second rotation radius, the second rotation radius is larger than the first rotation radius, and the transmission gear and the adjusting member are disposed in a coaxial arrangement.

In another embodiment of the present invention, the torque sensing device comprises a sensing member and a displayer. The displayer is electrically connected with the sensing member, the sensing member comprises a movable portion, and the movable portion is connected with the moving member to move along with it, such that the sensing member senses the displacement variation of the moving member to generate a torque signal, according to which the displayer displays the torque setting value.

In another embodiment of the present invention, the torque sensing device comprises a sensing member, a sensed member, and a displayer. The displayer is electrically connected with the sensing member, and the sensed member is disposed on the moving member to move along with it, such that the sensing member senses the displacement variation of the sensed member in a non-contact sensing manner to generate a torque signal, according to which the displayer displays the torque setting value.

In another embodiment of the present invention, the main body comprises a sensing hole in communication with the containing space, and the sensing member senses the displacement variation of the moving member through the sensing hole. The torque sensing device further comprises a casing and a circuit board, a power source, and a counter disposed on the casing. Also, the displayer, the sensing member, the power source, and the counter are electrically connected with the circuit board. The counter is configured to, according amount of disengagement between the releasing member and the pressing member, send a counter signal to be displayed on the displayer. The wrenching device comprises a wrenching member and a driver, the wrenching end is disposed on the driver, and the driver is removably disposed on the wrenching member. The torque sensing device further comprises a wireless transmission unit, which transmits the torque signal and the counter signal to a portable device. The main body further comprises a handle mounted around the second end.

For achieving the aforementioned objectives, another embodiment of the present invention provides a digitally displaying torque wrench with mechanical torque adjustment, comprising a main body, a wrenching device, a torque releasing device, a shaped elastic member, a torque adjusting device, and a torque sensing device. The main body forms a first end and a second end away from the first end along an axis, the axis dividing the main body into a forward side and a reverse side; the wrenching device swayable and disposed on the first end of the main body, the wrenching device comprising a wrenching member and a pressing member, the wrenching member pivotally disposed on the first end, the wrenching member comprising a wrenching end exposed from the main body and a distal end inserted into the main body, the pressing member pivotally disposed on the distal end; the torque releasing device pivotally disposed in the main body and optionally abutting against the pressing member; the shaped elastic member comprising a fixing end, the fixing end of the shaped elastic member fixed to the torque releasing device, the shaped elastic member comprising a shaped supporting section on one end thereof away from the fixing end, the shaped supporting section comprising a curve contact area, the shaped elastic member disposed in the main body and tilting with respect to the axis of the main body, an axial center line of the shaped elastic member including a tilt angle with the axis, the fixing end of the shaped elastic member arranged on the reverse side of the main body, the shaped supporting section of the shaped elastic member allowed to cross over the axis of the main body to be on the forward side of the main body; the torque adjusting device disposed in the main body and movable along a direction in parallel to the axis of the main body to generate a relative sliding relationship, the torque adjusting device comprising a resting member upon which the curve contact area of the shaped supporting section rests, the torque adjusting device operable by an user to adjust an axial position of the resting member with respect to the shaped supporting section, thereby changing the tilt angle of the shaped elastic member with respect to the main body; and the torque sensing device disposed in the main body corresponding to the torque adjusting device, the torque sensing device configured to sense a displacement variation of the torque adjusting device to display a torque setting value; when the resting member of the torque adjusting device rests upon the shaped elastic member away from the fixing end, the torque setting value is set at a minimum value; when the resting member of the torque adjusting device rests upon the shaped elastic member in adjacent to the fixing end, the torque setting value is set at a maximum value; when the force imposed wrenching the digitally displaying torque wrench increases to be equal to the torque setting value, the torque releasing device is disengaged with the pressing member, so as to stop the force imposing operation of the digitally displaying torque wrench; when the digitally displaying torque wrench is recovered to the normal status, the torque releasing device and the pressing member are restored to the original abutting status.

In another embodiment of the present invention, the curve contact area is formed in a shape which is thinner on two ends and thicker in the middle, so that the torque/distance curve of the digitally displaying torque wrench is presented in an approximate straight line. A first limiting portion is disposed on one side of the distal end, and the pressing member comprises a corresponding second limiting portion, wherein the first limiting portion and the second limiting portion are allowed to abut against each other, so as to limit the swaying degree of the pressing member. A recovering member is disposed between the distal end and the pressing member; the recovering member normally maintains the abutting status of the pressing member and the torque releasing device. A bias spring is disposed between the wrenching member and the inner wall of the main body to provide a force for the wrenching member to be recovered to the normal status.

With such configuration, the present invention achieves a quick disengagement function of a mechanical torque wrench, facilitates a quick torque setting value adjustment, and provides a digitally displaying function of an electronic torque wrench simultaneously, thereby fulfilling the needs of consumers.

Beneficial Effect of the Invention

BRIEF DESCRIPTION OF THE DRAWINGS

Description of the Drawings

Figure 1:
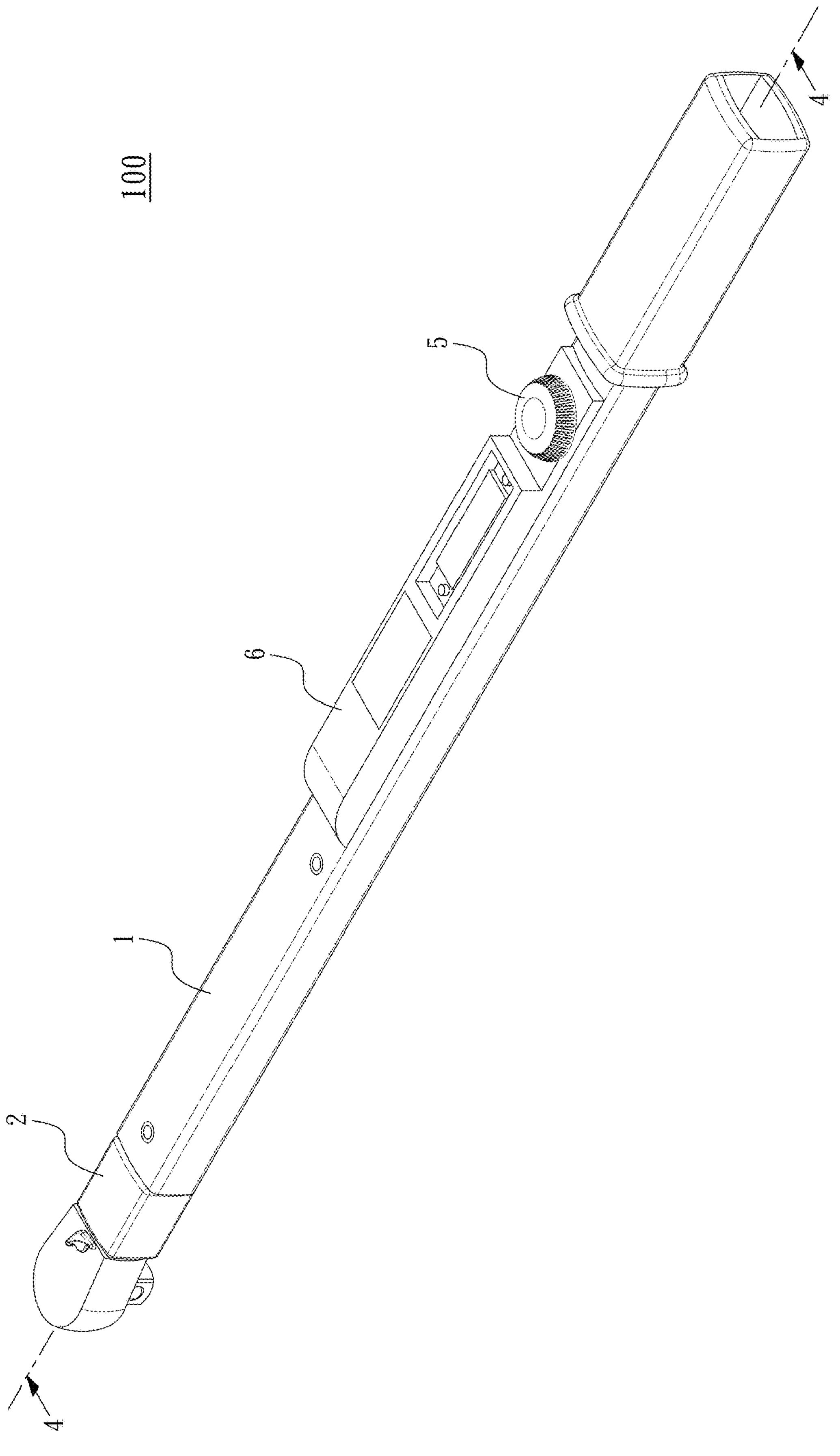

FIG. 1 is a perspective view of the digitally displaying torque wrench with mechanical torque adjustment in accordance with the first embodiment of the present invention.

Figure 2:
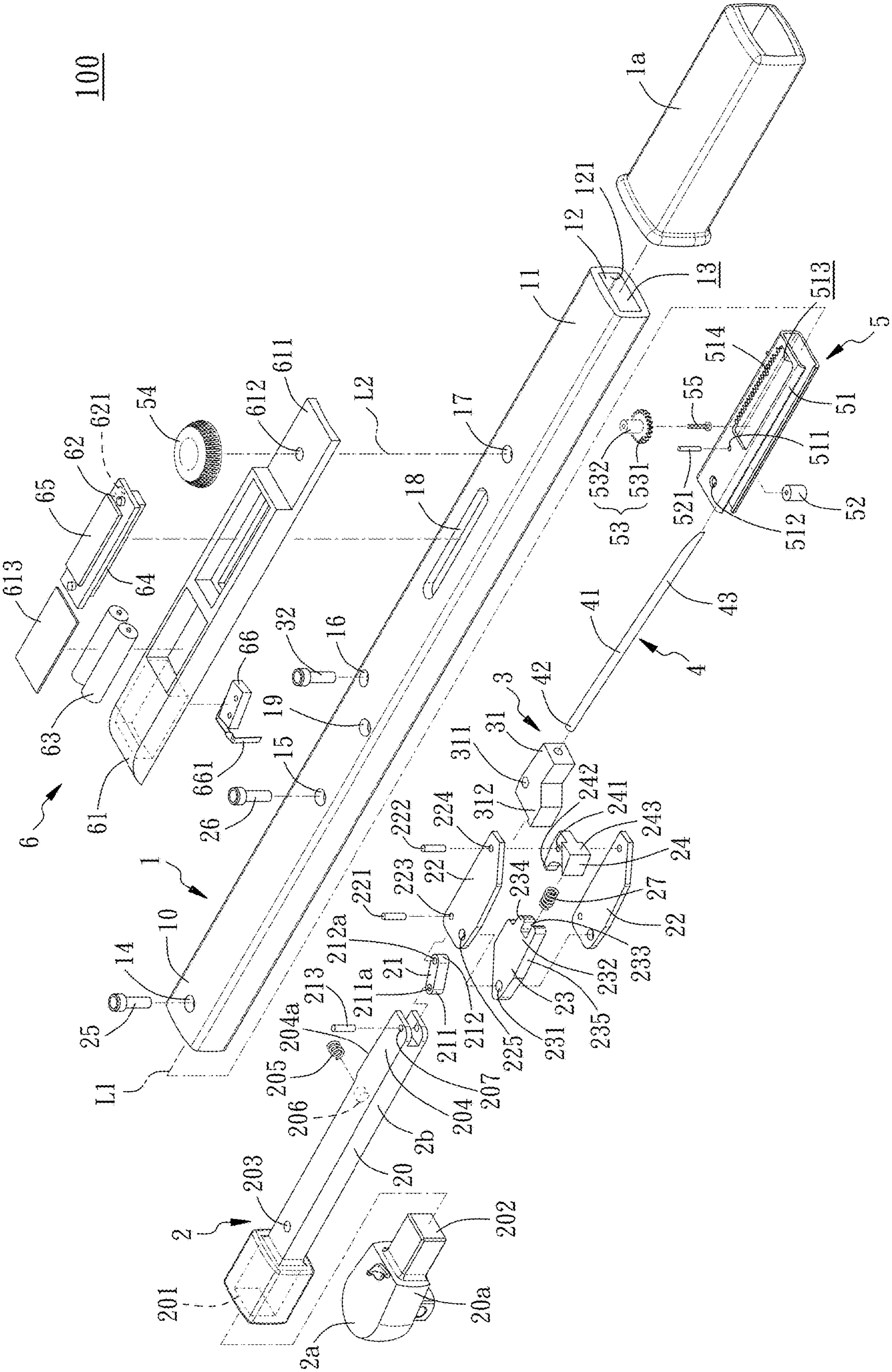

FIG. 2 is an exploded view of the digitally displaying torque wrench with mechanical torque adjustment in accordance with the first embodiment of the present invention.

Figure 3:
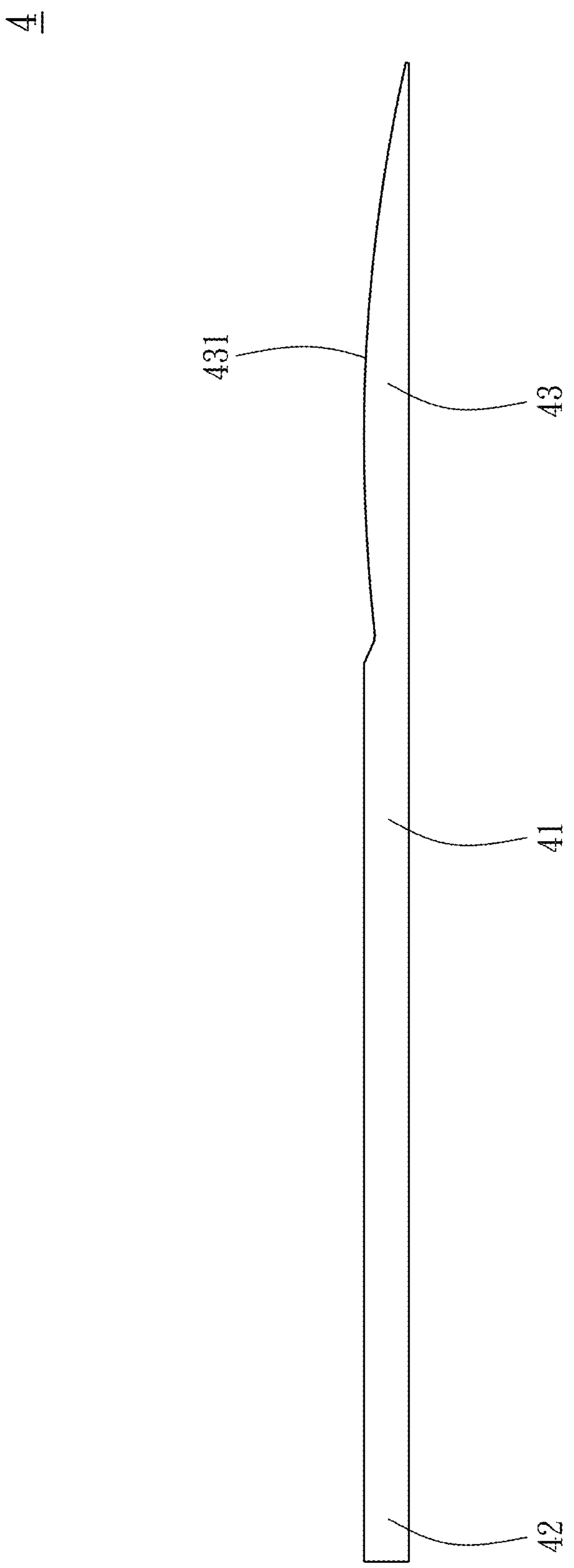

FIG. 3 is a schematic view illustrating structure of the shaped elastic member of the digitally displaying torque wrench with mechanical torque adjustment in accordance with the first embodiment of the present invention.

Figure 4:
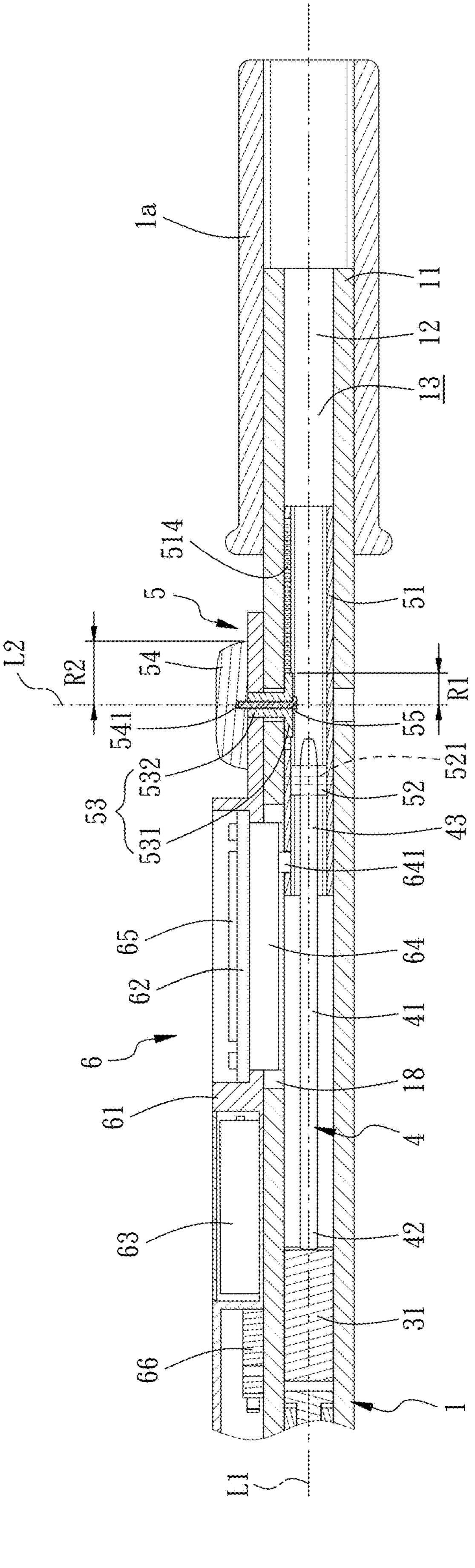

FIG. 4 is a partially cross-sectional view taken along line 4-4 in FIG. 1.

Figure 5A:
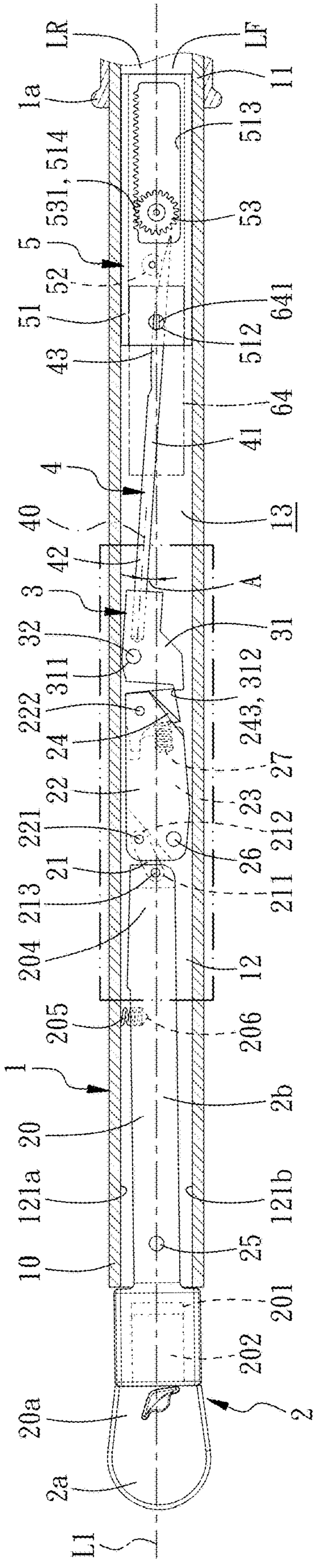

FIG. 5A is a sectional view of the digitally displaying torque wrench with mechanical torque adjustment in accordance with the first embodiment of the present invention, illustrating the resting member at the lower limit position, wherein the torque setting value of the digitally displaying torque wrench with mechanical torque adjustment is set at the minimum.

Figure 5B:
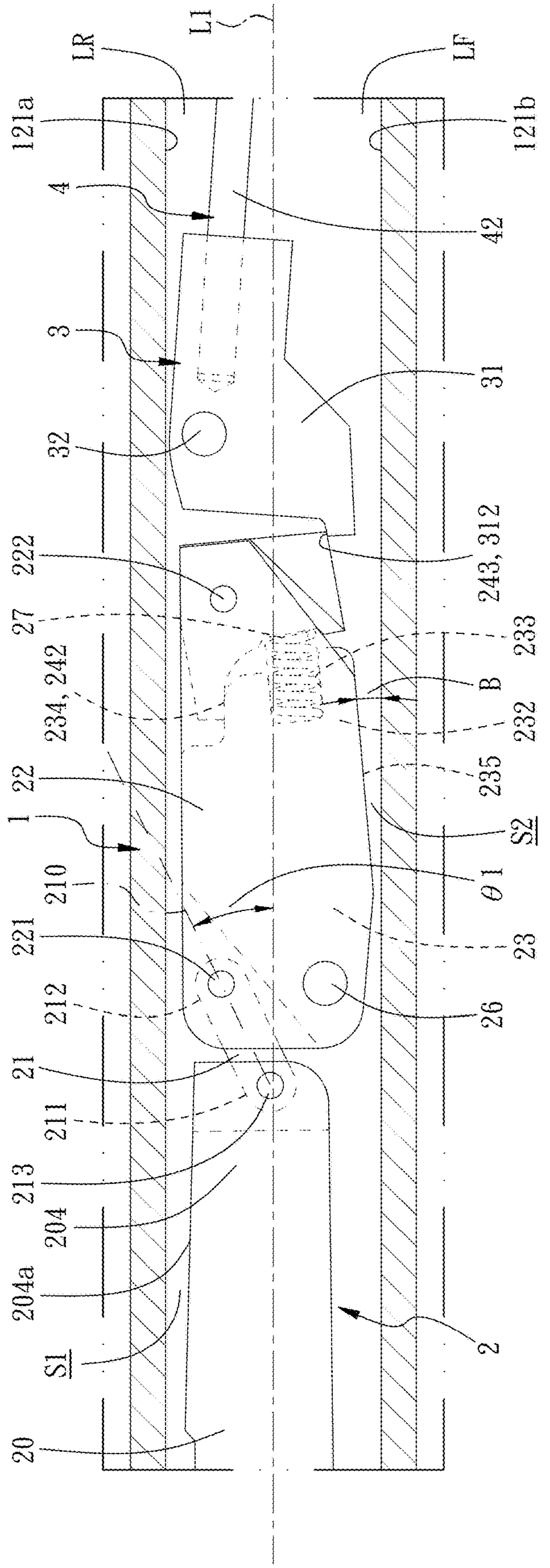

FIG. 5B is a partially enlarged view of FIG. 5A.

Figure 6A:
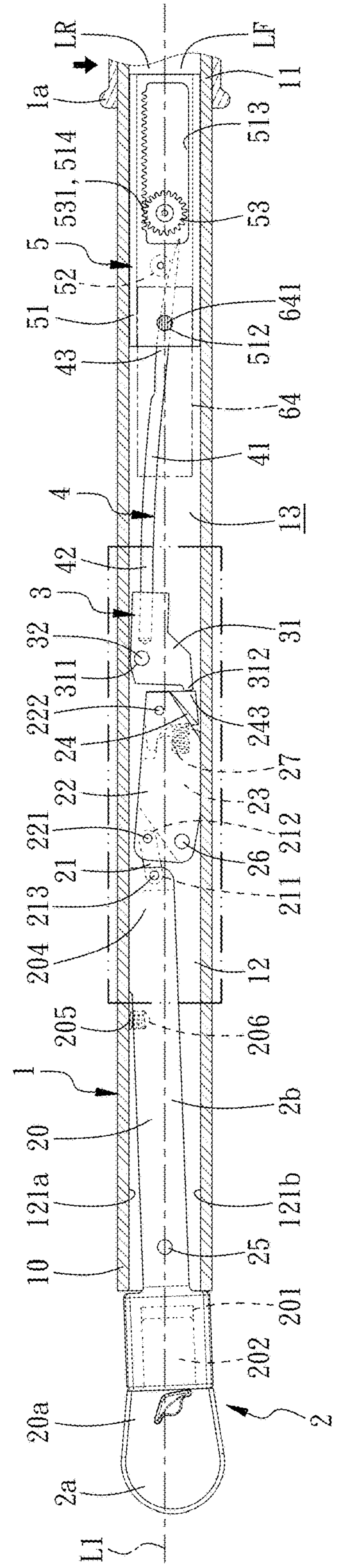

FIG. 6A, representing a continuation of FIG. 5A, is a schematic view of the wrenching motion of the digitally displaying torque wrench with mechanical torque adjustment in accordance with the first embodiment of the present invention.

Figure 6B:
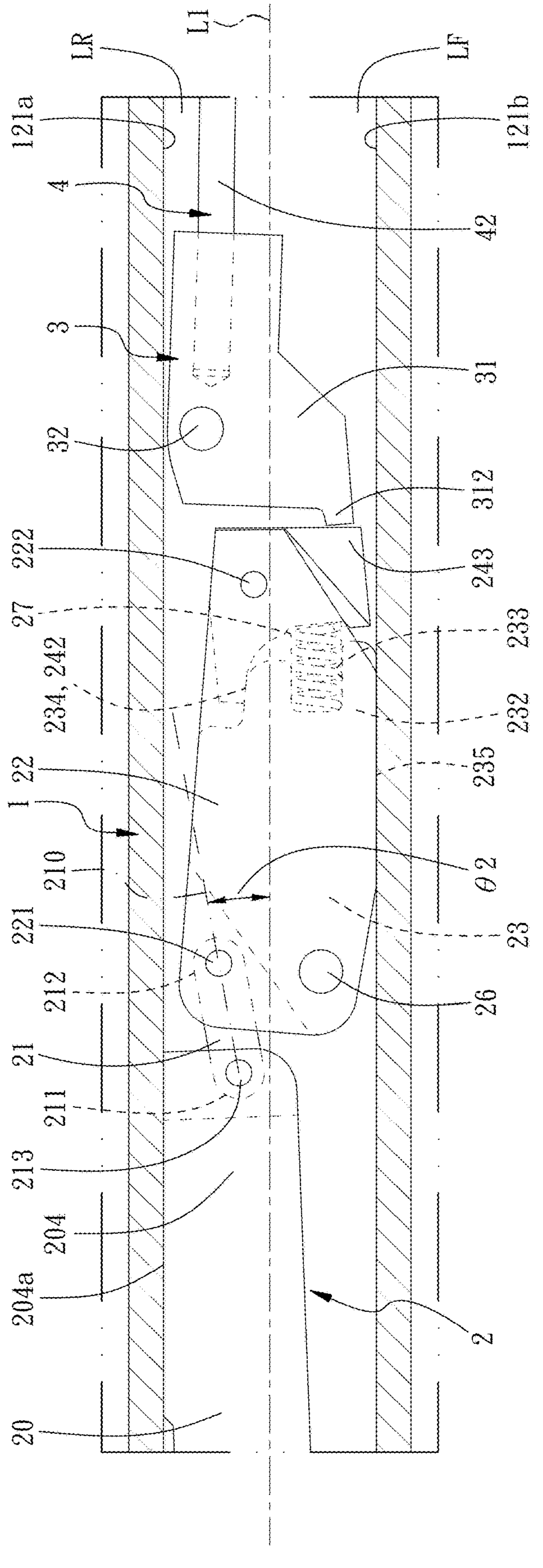

FIG. 6B is a partially enlarged view of FIG. 6A.

Figure 7:
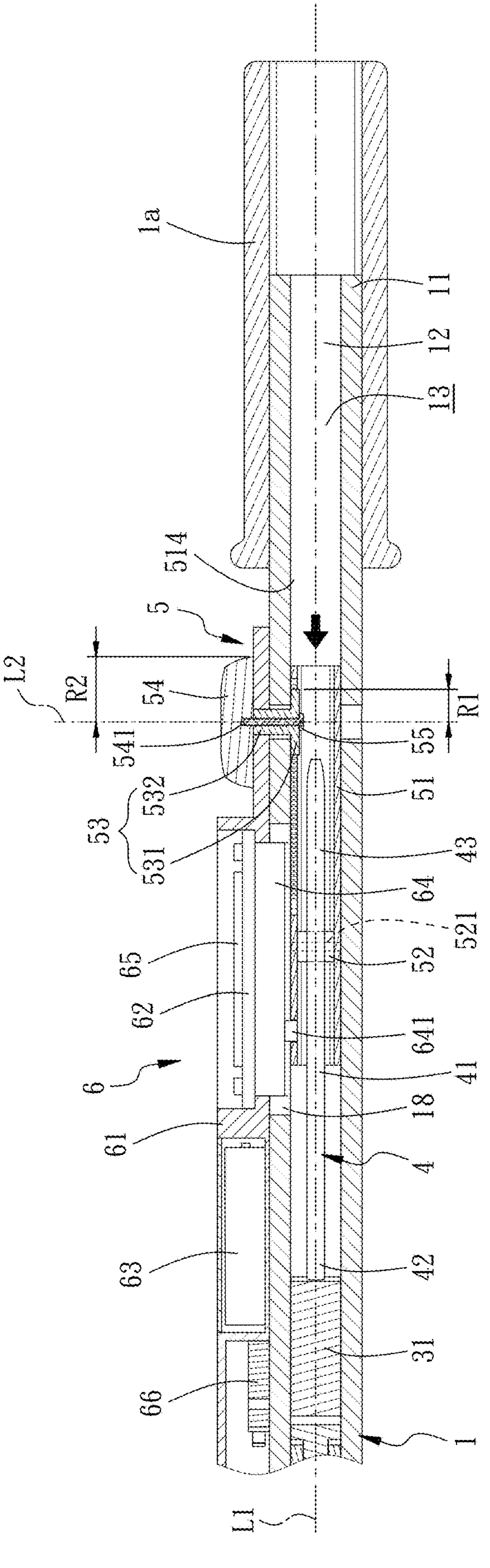

FIG. 7 is a sectional side view of the digitally displaying torque wrench with mechanical torque adjustment in accordance with the first embodiment of the present invention, illustrating the adjusting member rotating to carry the moving member to linearly move to adjust the resting member to the upper limit position.

Figure 8:
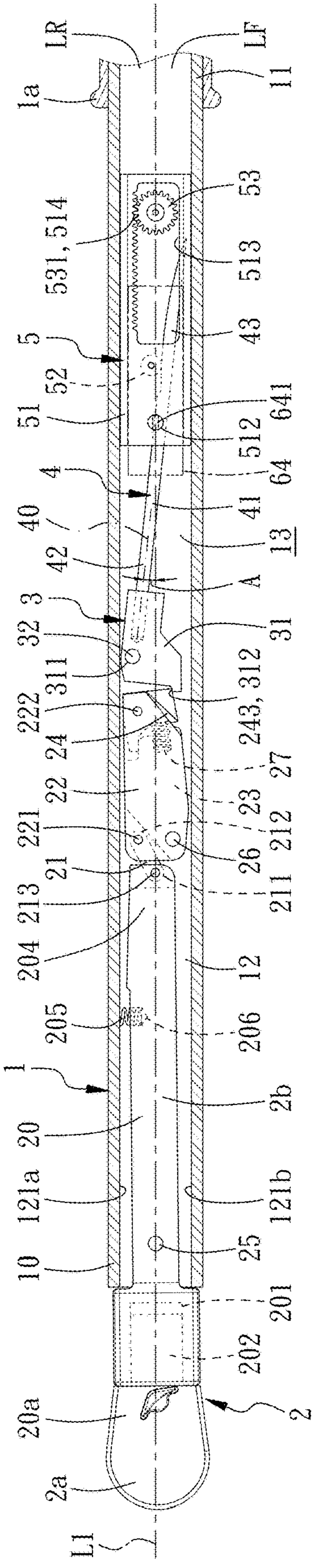

FIG. 8 is another sectional view of the digitally displaying torque wrench with mechanical torque adjustment in accordance with the first embodiment of the present invention, illustrating the resting member at the upper limit position, wherein the torque setting value of the digitally displaying torque wrench with mechanical torque adjustment is set at the maximum.

Figure 9:
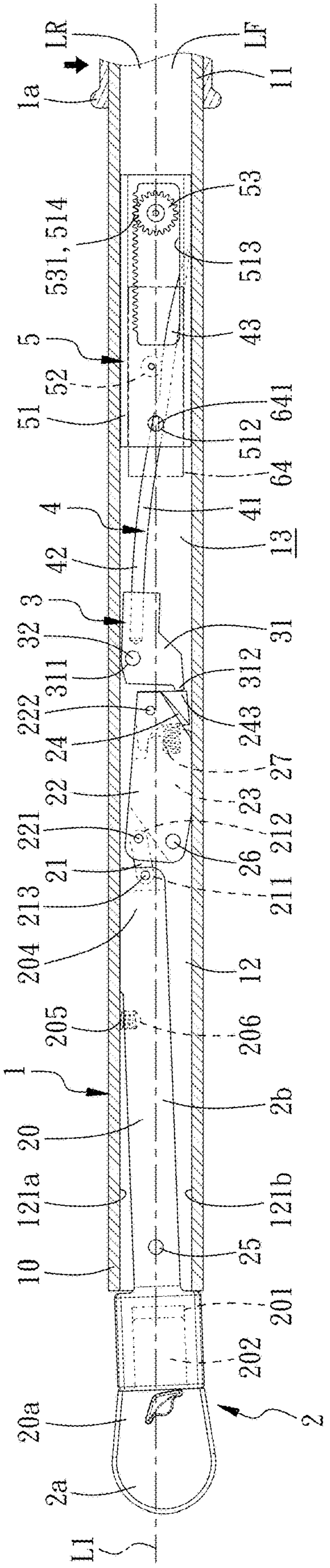

FIG. 9, representing a continuation of FIG. 8, is a schematic view of the wrenching motion of the digitally displaying torque wrench with mechanical torque adjustment in accordance with the first embodiment of the present invention, wherein the wrenching member and the actuating member simultaneously hit the first inner wall and the second inner wall, respectively.

Figure 10:
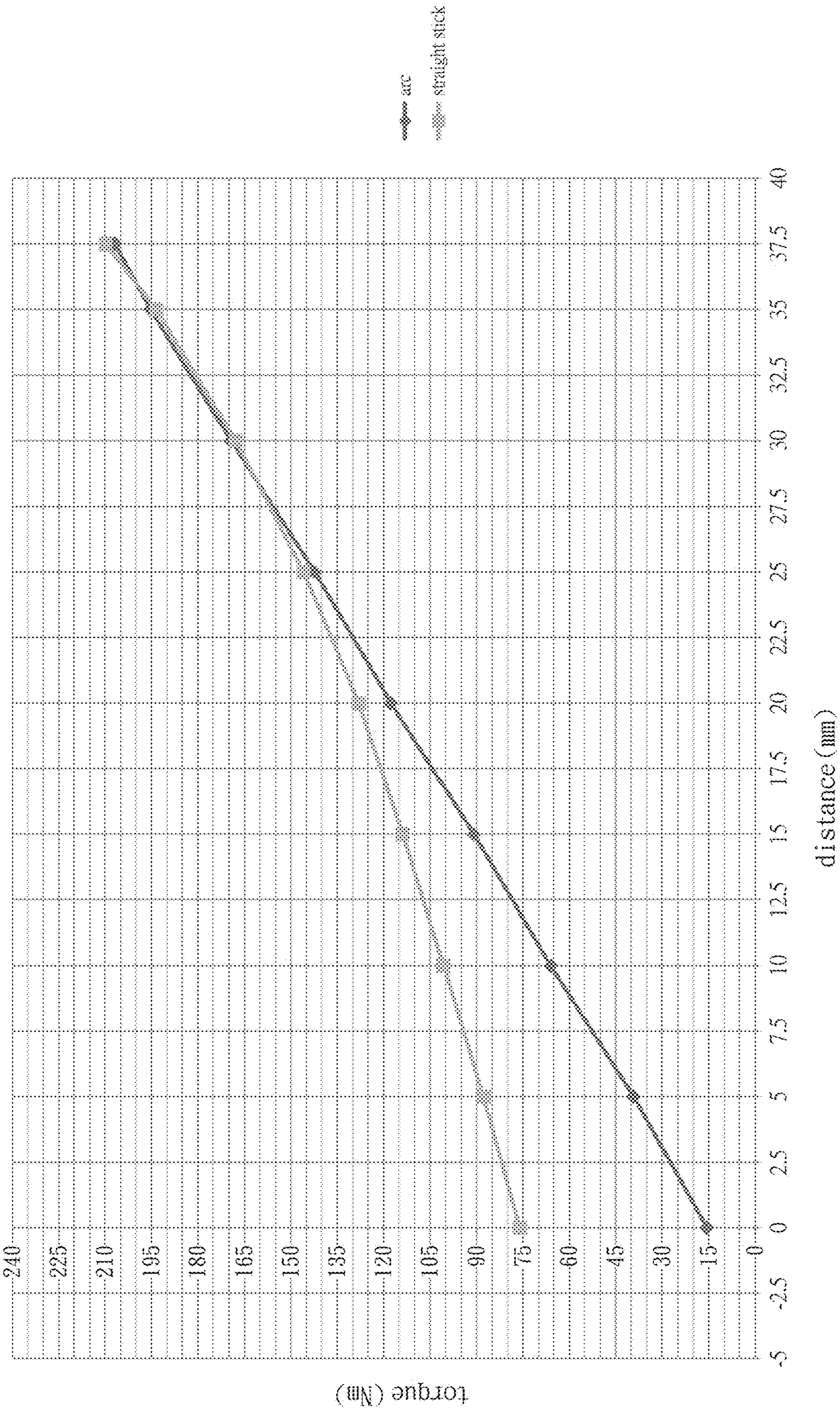

FIG. 10 is a torque/distance curve of the present invention and a conventional art straight stick type (elastic stick).

Figure 11:
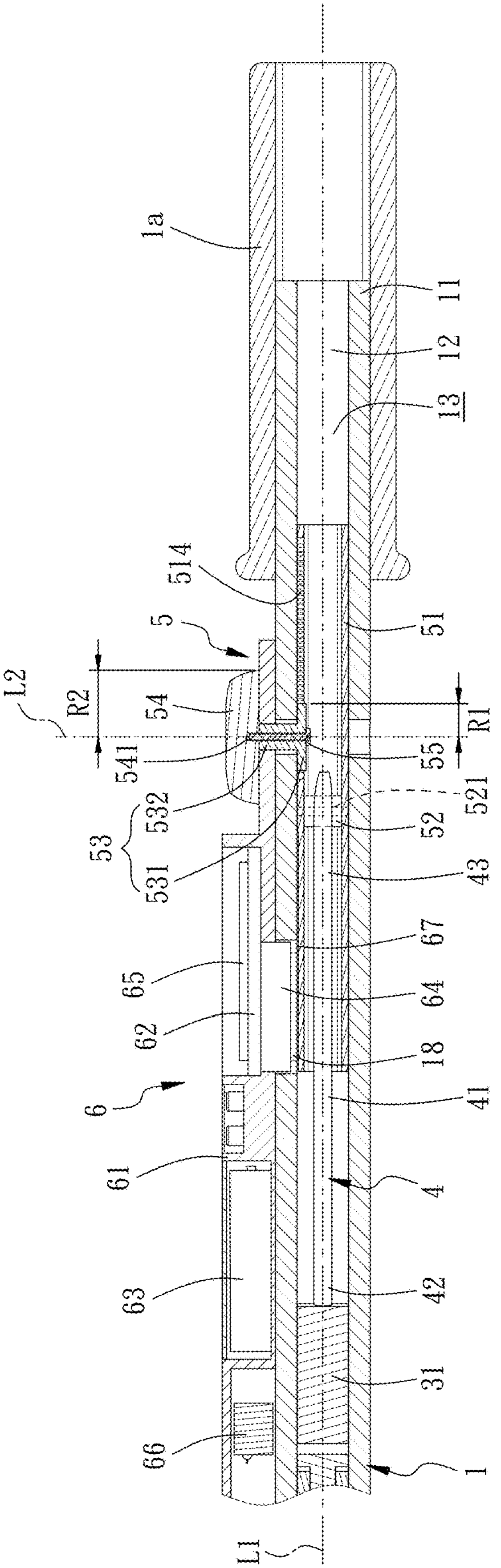

FIG. 11 is a partially sectional view of the digitally displaying torque wrench with mechanical torque adjustment in accordance with the second embodiment of the present invention.

Figure 12:
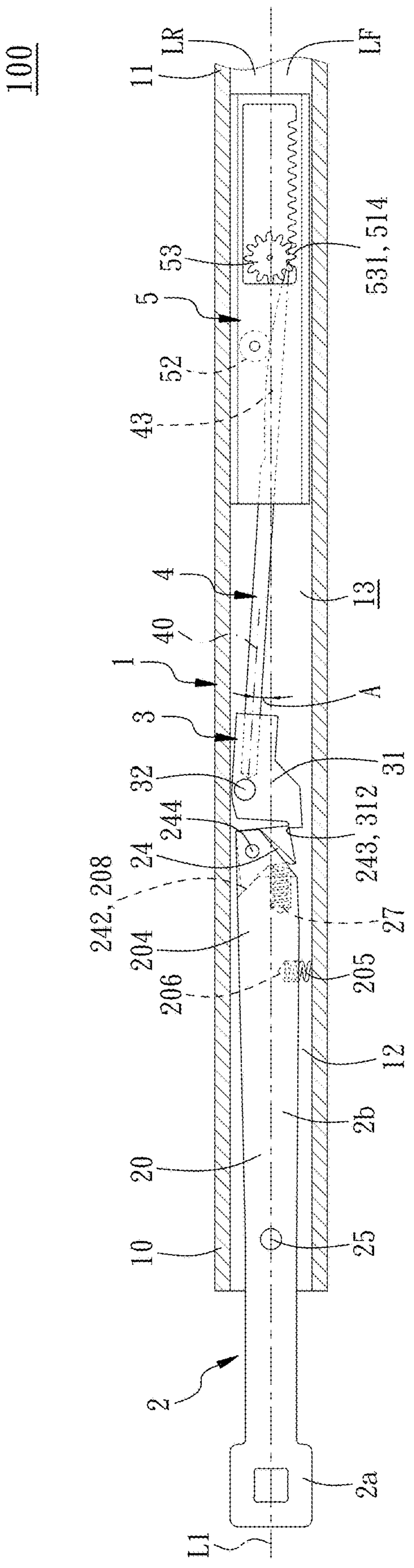

FIG. 12 is a sectional view of the digitally displaying torque wrench with mechanical torque adjustment in accordance with the third embodiment of the present invention.

GLOSSARY

100: digitally displaying torque wrench; L1: axis; L2: rotation axis; 1: main body; 10: first end; 11: second end; 1*a*: handle; 12: containing space; 121: inner wall; 121*a*: first inner wall; 121*b*: second inner wall; 13: guiding portion; 14: first pivot hole; 15: second pivot hole; 16: third pivot hole; 17: through hole; 18: sensing hole; 19: through hole; 2: wrenching device; 2*a*: wrenching end; 2*b*: joining portion; 20: wrenching member; 201: first connecting end; 20*a*: driver; 202: second connecting end; 203: pivotal combination bore; 204: distal end; 205: bias spring; 206: containing bore; 207: through hole; 208: first limiting portion; 204*a*: first hitting face; 21: linkage bar; 211: first combining end; 212: second combining end; 213 connection pin; 211*a*: through hole; 210: axial center line; 22: clamp board; 221: connection pin; 222: connection pin; 223: through hole; 224: through hole; 225: through hole; 23: actuating member; 231: pivot hole; 232: actuating end; 233: recess; 234: first limiting portion; 235: second hitting face; 24: pressing member; 241: through hole; 242: second limiting portion; 243: first abutting portion; 244: connection pin; 25: first fixing pin; 26: second fixing pin; 27: recovering member; 3: torque releasing device; 31: releasing member; 311: pivotal combination bore; 312: second abutting portion; 32: third fixing pin; 4: shaped elastic member; 40: axial center line; 41: body section; 42: fixing end; 43: shaped supporting section; 431: curve contact area; 5: torque adjustment adjusting device; 51: moving member; 511: pivot hole; 512: insertion bore; 513: moving groove; 514: first tooth portion; 52: resting member; 521: connection pin; 53: transmission gear; 531: second tooth portion; 532: rotation axle; 54: adjusting member; 541: thread bore; 55: fixing screw; 6: torque sensing device; 61: casing; 611: installation portion; 612: through hole; 613: movable cover; 62: circuit board; 621: wireless transmission unit; 63: power source; 64: sensing member; 641: movable portion; 65: displayer; 66: counter; 661: trigger foot; 67: sensed member; R1: first rotation radius; R2: second rotation radius; LF: forward side; LR: reverse side; S1: first hitting space; S2: second hitting space; A: tilt angle; B: impact angle; θ1: first angle; θ2: second angle.

PRACTICING PREFERRED EMBODIMENT OF THE INVENTION

Preferred Embodiment of the Present Invention

Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 1 to FIG. 10, the present invention discloses a first embodiment of a digitally displaying torque wrench 100 with mechanical torque adjustment, comprising a main body 1, a wrenching device 2, a torque releasing device 3, a shaped elastic member 4, a torque adjusting device 5, and a torque sensing device 6. Therein, the torque adjusting device 5 is allowed to be operated by a user to quickly adjust the predetermined torque setting value, and the torque sensing device 6 digitally displays the torque setting value.

The main body 1 forms a first end 10 and a second end 11 away from the first end 10 along an axis L1. The axis L1 divides the main body 10 into a forward side LF and a reverse side LR. The main body 1 comprises a containing space 12. Therein, in the embodiment, the main body 1 is formed in a shape of flat rectangular hollow tube, and the containing space 12 comprises a guiding portion 13 therein. Also, the main body 1 comprises a first pivot hole 14, a second pivot hole 15, and a third pivot hole 16 orderly disposed thereon from the first end 10 toward the second end 11, and a through hole 17 and a sensing hole 18 disposed in adjacent to the second end 11. The first pivot hole 14, the second pivot hole 15, the third hole 16, the through hole 17, and the sensing hole 18 are in communication with the containing space 12, respectively.

The wrenching device 2 is swayable and disposed on the first end 10 of the main body 1. The wrenching device 2 comprises a wrenching member 20, a linkage bar 21, two clamp boards 22, an actuating member 23, and a pressing member 24. The wrenching device 2 comprises a wrenching end 2*a* exposed from the main body 1 for wrenching a fastener. In the embodiment, the wrenching device 2 further comprises a driver 20*a*. The wrenching end 2*a* is disposed on the driver 20*a*, and the driver 20*a* is removably disposed on the wrenching member 20. For example, the wrenching member 20 comprises a first connecting end 201 formed in a recess shape, and the driver 20*a* comprises a second connecting end 202 formed in a protrusion block shape, such that the first connecting end 201 and the second connecting end 202 are engaged in a concave and convex configuration, allowing the user to select a specific driver 20*a* to be combined on the wrenching member 20 according to different operational needs.

The wrenching member 20 is pivotally disposed in the main body 1 and allowed to generate a relative pivoting relationship. The wrenching member 20 has a joint portion 2*b* disposed away from the wrenching end 2*a* and inserted into the first end 10. The wrenching member 20 is pivotally connected with the first end 10 of the main body 1 by a first fixing pin 25 passing through the first pivot hole 14 of the main body 1 and a pivotal combination bore 203 of the wrenching member 20. The joint portion 2*b* comprises a distal end 204 formed away from the wrenching end 2*a*. A bias spring 205 is disposed between the joint portion 2*b* and an inner wall 121 of the main body 1. The bias spring 205 comprises one end abutting against the inner wall 121 of the main body 1 and the other end abutting against a containing bore 206 formed on the lateral side of the wrenching member 20, such that the bias spring 205 provides a force for recovering the wrenching member 20 to the normal status. Therein, the inner wall 121 comprises a first inner wall 121*a* on the reverse side LR and a second inner wall 121*b* on the forward side LF. The bias spring 205 abuts against the first inner wall 121*a* and the containing bore 206. Also, the wrenching member 20 comprises a first hitting face 204*a* on one side of the distal end 204, and a first hitting space S1 is formed between the first hitting face 204*a* and the first inner wall 121*a*.

The linkage bar 21 comprises a first combining end 211 and an opposite second combining end 212. In the embodiment, the first combining end 211 of the linkage bar 21 is pivotally disposed on the distal end 204 by a connection pin 213 passing through a through hole 207 of the distal end 204 and a through hole 211*a* of the linkage bar 21.

Two sides of the two clamp boards 22 sandwich two sides of the actuating member 23 with the connection pins 221, 222 passing through the through holes 223, 224 of the two clamp boards 22, respectively. Also, the second combining end 212 of the linkage bar 21 is pivotally disposed on one side of the two clamp boards 22 by the connection pin 221.

Regarding the actuating member 23 and the two clamp boards 22, a second fixing pin 26 passes through the second pivot hole 15, a through hole 225 of the two clamp boards 22, and a pivot hole 231 of the actuating member 23, such that the actuating member 23 is pivotally disposed between the main body 1 and the two clamp boards 22, whereby the actuating member 23 is allowed to sway between a first pivot position and a second pivot position with respect to the main body 1, allowing the actuating member 23 to be operationally linked with the second combining end 212. In other words, when the wrenching member 20 sways, the linkage bar 21 is operationally linked with the two clamp boards 22, so that the two clamp boards 22 drive the actuating member 23 to sway together. Also, the actuating member 23 comprises an actuating end 232 formed on one end thereof away from the linkage bar 21. The actuating end 232 comprises a recess 233 and a first limiting portion 234. Also, the actuating member 23 comprises a second hitting face 235 on one side thereof, and a second hitting space S2 is formed between the second hitting face 235 and the second inner wall 121*b*.

The pressing member 24 is pivotally disposed on one end of the wrenching device 2 in opposite to the wrenching end 2*a*. In the embodiment, the pressing member 24 comprises a through hole 241 to be disposed on another side of the two clamp boards 22 by the connection pin 222, so as to be linked and contact with the actuating end 232 of the actuating member 23. Also, the pressing member 24 comprises a second limiting portion 242 on one side thereof facing the actuating member 23, and comprises a first abutting portion 243 disposed on another side thereof. The first limiting portion 234 and the second limiting portion 242 abut against each other to limit the swaying and spinning degree of the pressing member 24.

The torque releasing device 3 is disposed in the containing space 12 of the main body 1 and optionally abuts against one end of the wrenching device 2 away from the wrenching end 2*a*; in other words, the torque releasing device 3 generates an abutting relationship against the wrenching device 2. In the embodiment, the torque releasing device 3 is allowed to abut against the pressing member 24 of the wrenching device 2. The torque releasing device 3 comprises a releasing member 31. The releasing member 31 is pivotally disposed in the main body 1 and abuts against the pressing member 24. When the force imposed wrenching the digitally displaying torque wrench 100 continuously increases to be equal to the torque setting value, the releasing member 31 is disengaged with the pressing member 24 to stop the force imposing operation of the digitally displaying torque wrench 100; when the digitally displaying torque wrench 100 is recovered to the normal status, the releasing member 31 and the pressing member 24 are automatically recovered to the originally engagement status. In the embodiment, the releasing member 31 is pivotally disposed in the main body 1 by a third fixing pin 32 passing through the third pivot hole 16 and a pivotal combination bore 311 of the releasing member 31, so as to be swayable between a first position and a second position. Therein, the releasing member 31 comprises a second abutting portion 312 disposed away from the shaped elastic member 4 corresponding to the pressing member 24 for abutting against the first abutting portion 243. Also, the wrenching device 2 further comprises a recovering member 27. The recovering member 27 comprises one end abutting against the recess 233 of the actuating member 23 of the wrenching device 2, and another end abutting against one side of the pressing member 24 away from the releasing member 31, thereby normally maintaining the abutting status of the pressing member 24 and the releasing member 31.

The shaped elastic member 4 is disposed in the main body 1 and tilts with respect to the axis L1 of the main body 1. An axial center line 40 of the shaped elastic member 4 and the axis L1 include a tilt angle A, and the shaped elastic member 4 has one end fixed to the releasing member 31 of the torque releasing device 3. In the embodiment, the shaped elastic member 4 is formed in an elongate stick shape and comprises a body section 41 along the axial center line 40. The body section 41 comprises a fixing end 42 on one end thereof and a shaped supporting section 43 formed on the other end away from the fixing end 42. The shaped supporting section 43 has a curve contact area 431. The fixing end 42 is arranged on the reverse side LR of the main body 1 and combined with one side of the releasing member 31 of the torque releasing device 3 away from the pressing member 24. The shaped supporting section 43 of the shaped elastic member 4 is allowed to cross over the axis L1 of the main body 1 to the forward side LF of the main body 1. As shown by FIG. 3, the curve contact area 431 of the shaped supporting section 43 is formed in a shape which is thinner on two ends and thicker in the middle.

The torque adjusting device 5 is disposed in the main body 1 and allowed to move along a direction in parallel to the axis L1 of the main body 1 to generate a relative sliding relationship. The torque adjusting device 5 comprises a moving member 51, a resting member 52, a transmission gear 53, and an adjusting member 54. The moving member 51 is formed in an approximate frame shape, and slidably disposed in the main body 1 to slide along the direction of the axis L1 of the main body 1. Also, the moving member 51 is disposed in the containing space 12 of the main body 1, and slidably disposed in the main body 1 along the guiding portion 13. The moving member 51 has a contour approximately similar to the shape of the guiding portion 13. The resting member 52 is a roller and rotatably disposed in one end of the moving member 51, so that the curve contact area 431 of the shaped supporting section 43 of the shaped elastic member 4 rests upon the resting member 52. The torque adjusting device 5 is operable by the user to quickly adjust the axial position of the resting member 52 with respect to the shaped supporting section 43, thereby changing the tilt angle A of the shaped elastic member 4 with respect to the main body 1. In the embodiment, the resting member 52 is pivotally disposed in a pivot hole 511 of the moving member 51 by a connection pin 521. The resting member 52 contacts the shaped elastic member 4 in a rolling manner. Therein, adjusting the axial position of the resting member 52 with respect to the shaped supporting section 43 changes the contact area between the first abutting portion 243 and the second abutting portion 312.

Also, the moving member 51 comprises an insertion bore 512 on one side thereof in adjacent to the connection pin 521, and a moving groove 513 formed on the other side thereof. A first tooth portion 514 is disposed on one side of an inner edge of the moving groove 513. The first tooth portion 514 is arranged along the direction in parallel to the axis L1 and formed in a straight strip shape. The shaped supporting section 43 of the shaped elastic member 4 passes through the moving member 51, so that the resting member 52 contacts and rests upon the shaped supporting section 43, whereby the movement of the moving member 51 drives the resting member 52 to simultaneously move, changing the support position of the resting member 52 resting upon the shaped supporting section 43 of the shaped elastic member 4.

Notably, the shaped elastic member 4 bears the wrenching torque of the digitally displaying torque wrench 100. The shaped elastic member 4 is considered as the force arm, the wrenching end 2*a* of the wrenching device 2 is the force application point, and the resting member 52 is the fulcrum. Therefore, adjusting the length of the force arm between the resting member 52 and the wrenching end 2*a* of the wrenching device 2 decides the torque setting value set on the digitally displaying torque wrench 100. In other words, when the resting member 52 of the torque adjusting device 5 rests upon the position of the shaped elastic member 4 away from the fixing end 42, the torque setting value is set at the minimum; when the resting member 52 of the torque adjusting device 5 rests upon the position of the shaped elastic member 4 in adjacent to the fixing end 42, the torque setting value is set at the maximum.

Further, when the torque setting value is at the minimum, the section on the shaped elastic member 4 from the resting member 52 to the fixing end 42 is easily bent and deformed; when the torque setting value is at the maximum, the section on the shaped elastic member 4 from the resting member 52 to the fixing end 42 is not easily bent and deformed. Meanwhile, when the torque setting value is at the minimum, the tilt angle A of the shaped elastic member 4 is the minimum, and the swaying angle of the releasing member 31 with respect to the main body 1 is small, so that the radial (the direction perpendicular to the axis L1) component force worked by the resting member 52 on the shaped elastic member 4 is smaller. Therefore, the contact area between the first abutting portion 243 of the pressing member 24 and the second abutting portion 312 of the releasing member 31 is correspondingly smaller. When the torque setting value is at the maximum, the tilt angle A of the shaped elastic member 4 is the maximum, and the swaying angle of the releasing member 31 with respect to the main body 1 is large, so that the radial component force worked by the resting member 52 on the shaped elastic member 4 is larger. Therefore, the contact area between the first abutting portion 243 of the pressing member 24 and the second abutting portion 312 of the releasing member 31 is correspondingly larger. As a result, the force of the releasing member 31 clamping the pressing member 24 is increased; in other words, a higher wrenching torque is needed to disengage those two, so that the torque setting value of the digitally displaying torque wrench 100 is adjusted higher. In other words, the upper limit of the torque setting value is extended, achieving a wider range of the torque setting value.

The transmission gear 53 defines a first rotation radius R1 and a second tooth portion 531 disposed along the first rotation radius R1, the second tooth portion 531 is engaged with the first tooth portion 514 of the moving member 51, and the tooth amount of the second tooth portion 531 is smaller than the tooth amount of the first tooth portion 514. Also, the second tooth portion 531 of the transmission gear 53 is disposed about a rotation axis L2. The rotation axis L2 is perpendicular to the axis L1, and the transmission gear 53 comprises a rotation axle 532 disposed along the direction of the rotation axis L2.

The adjusting member 54 is rotatably disposed on the outer side of the main body 1 along the rotation axis L2 to be rotated by the user. In the embodiment, the adjusting member 54 is formed in a circular rotation disk. The adjusting member 54 defines a second rotation radius R2, and the second rotation radius R2 is larger than the first rotation radius R1. The adjusting member 54 and the rotation axle 532 of the transmission gear 53 are disposed in a coaxial arrangement, so that the adjusting member 54 is connected with the transmission gear 53. In the embodiment, the adjusting member 54 is connected with the transmission gear 53 by a fixing screw 55 passes through the rotation axle 532 of the transmission gear 53 and a thread bore 541 of the adjusting member 54. Therefore, the user rotates the adjusting member 54 to simultaneously drive the transmission gear 53, such that the engagement relationship of the second tooth portion 531 and the first tooth portion 514 drives the moving member 51 to linearly move with respect to the main body 1, facilitating the adjustment of the position of the resting member 52 with respect to the shaped supporting section 43 of the shaped elastic member 41.

Notably, because the second rotation radius R2 of the adjusting member 54 is larger than the first rotation radius R1, the user is allowed to drive the transmission gear 53 with a smaller strength for the transmission gear 53 to carry the moving member 51 to slide, without any resistance of spring during the adjustment process, thereby achieving the function of a quick adjustment of the upper limit or the lower limit of the torque setting value.

The torque sensing device 6 is disposed on the main body 1 corresponding to the torque adjusting device 5. The torque sensing device 6 is configured to sense the adjustment of the torque adjusting device 5 and display the torque setting value, allowing the user to directly understand the setting status of the torque setting value, facilitating the operational usage. In the embodiment, the torque sensing device 6 comprises a casing 61, a circuit board 62, a power source 63, a sensing member 64, a displayer 65, and a counter 66; the circuit board 62, the power source 63, the sensing member 64, and the counter 66 are disposed on the casing 61; and the power source 63, the sensing member 64, the displayer 65, and the counter 66 are electrically connected with the circuit board 62.

The casing 61 and the adjusting member 54 are arranged on the same side of the main body 1, and the casing 61 comprises an installation portion 611 on one end away from the wrenching end 2*a* for receiving the adjusting member 54 thereon. The aforementioned rotation axle 532 of the transmission gear 53 passes through the through hole 17 and a through hole 612 of the installation portion 611, so that the casing 61 is also fixed to the main body 1 by the fixing screw 55. The casing 61 comprises a movable cover 613 on another end thereof; when the movable cover 613 opens, the power source 63 in the casing 61 is allowed to be freely taken out for replacement.

The circuit board 62, the sensing member 64, and the displayer 65 are arranged between the installation portion 611 and the movable cover 613; the displayer 65 is exposed from the casing 61, and the sensing member 64 is in positional alignment with the sensing hole 18. The sensing member 64 comprises a movable portion 641. The movable portion 641 is inserted into the insertion bore 512 of the moving member 51 through the sensing hole 18 to move along with it, such that the sensing member 64 senses the displacement variation of the moving member 51 to generate a torque signal, and the displayer 65 displays the torque setting value according to the torque signal. Therein, in the embodiment, the sensing member 64 is a variable resistor.

The counter 66 is disposed in a positional alignment with the pressing member 24 of the torque releasing device 3. The counter 66 comprises a trigger foot 661 inserted into a through hole 19 of the main body 1 to resist against one side of the pressing member 24, such that the counter 66 is allowed to, according an amount of disengagement of the releasing member 31 and the pressing member 24, send a counter signal to be displayed on the displayer 65, thereby enabling the user to understand the times of the digitally displaying torque wrench 100 exceeding the torque setting value, and accurately fasten the fastener to the predetermined pound value. Therein, to facilitate the convenience of usage, the torque sensing device 6 is further provided with a count reset button and button of other functions. The circuit board 62 further comprises a wireless transmission unit 621, which is configured to wirelessly send the torque signal and the counter signal to a portable device (such as a smartphone or laptop), allowing the portable device to simultaneously display or save the torque setting value or the aforementioned disengagement amount.

Moreover, the main body 1 of the present invention further comprises a handle 1*a* mounted around the second end 11 of the main body 1 for handgrip operation.

Referring to FIG. 4, FIG. 5A, and FIG. 5B, as shown by FIG. 5A, the resting member 52 is at the lower limit position; in other words, the resting member 52 is supported at the most distal end of the shaped supporting section 43 of the shaped elastic member 4 and at the farthest position away from the wrenching end 2*a*; accordingly, the torque setting value of the digitally displaying torque wrench 100 is set at the minimum. Meanwhile, the releasing member 31 is also at the first position, so that the torque adjusting device 5 allows the user to adjust the position of the resting member 52 with respect to the curve contact area 431 of the shaped supporting section 43, allowing a quick adjustment from the torque lower limit to the torque upper limit. As shown by FIG. 5B, when the digitally displaying torque wrench 100 is in the normal status, an axial center line 210 of the linkage bar 21 and the axis L1 include a first angle θ1, the second hitting face 235 and the axis L1 include an impact angle B, the second combining end 212 of the linkage bar 21 is arranged on the reverse side LR, and the first angle θ1 is larger than the impact angle B.

Then as shown by FIG. 6A and FIG. 6B, when the digitally displaying torque wrench 100 is wrenched and the actuating member 23 is at the first pivot position, the actuating member 23 transmits the counterforce of the wrenching device 2 to the shaped elastic member 4, so that the section of the shaped elastic member 4 from the fixing end 42 to the resting member 52 generates a bending deformation; when the wrenching force of the digitally displaying torque wrench 100 is larger than the torque setting value, the releasing member 31 is disengaged with the pressing member 24 and stop the force transmission of the digitally displaying torque wrench 100, such that when the actuating member 23 sways from the first pivot position to the second pivot position, the actuating member 23 carries the linkage bar 21 to move with respect to the main body 1, and the actuating member 23 and the wrenching member 20 simultaneously hit the first inner wall 121*a* and the second inner wall 121*b* of the main body 1, wherein the first hitting face 204*a* of the wrenching member 20 enters the first hitting space S1 to hit the first inner wall 121*a*, and the second hitting face 235 of the actuating member 23 enters the second hitting space S2 to hit the second inner wall 121*b*, thereby providing an obvious mechanical torque disengagement sensation during the wrenching motion of the user and reminding the user to stop imposing the force. Also, because the linkage bar 21 and the actuating member 23 are linked and disposed between the wrenching member 20 and the releasing member 31, when the releasing member 31 is disengaged with the pressing member 24, the linkage bar 21 immediately converts the original pushing force coming from the wrenching member 20 into a pulling force for pulling the wrenching member 20, so as to delay the timing of the wrenching member 20 hitting the first inner wall 121*a* through the pulling force. Because when the wrench reaches the predetermined torque value, the user tends to keep imposing the force due to the wrenching inertia, if the wrenching member 20 immediately hits the first inner wall 121*a*, the wrenching member 20 forms a rigid contact with the main body 1, so that the force imposed by the user is transmitted through the main body 1 to the wrenching member 20, and therefore imposing the excessive torque to the fastener, causing the excessive torque value of the fastener to present an inaccurate value. Therefore, through the linking effect of the linkage bar 21 of the present invention, a buffer effect is provided to resolve the excessive force imposing by the user due to a wrenching inertia when the wrenching force of the fastener reaches the predetermined torque value, preventing the fastener from being excessively imposed with the torque and achieving a more accurate wrenching operation.

Besides, as shown by FIG. 6B, when the torque releasing device 3 stops the force imposing operation of the digitally displaying torque wrench 100, the axial center line 210 of the linkage bar 21 and the axis L1 include a second angle θ2, which is smaller than the first angle θ1, and the first combining end 211 of the linkage bar 21 is allowed to cross over the axis L1 of the main body 1 to the reverse side LR of the main body 1, so that the first combining end 211 and the second combining end 212 are both on the reverse side LR of the main body 1. As mentioned above, when the releasing member 31 is at the second position, the shaped elastic member 4 enables the torque releasing device 3 to provide a force for the wrenching device 2 to be recovered to the original status, and when the wrenching force of the digitally displaying torque wrench 100 is smaller than the torque setting value, the pressing member 24 and the releasing member 31 are recovered to the originally abutting status.

Referring to FIG. 7 and FIG. 8, the user is able to rotate the adjusting member 54 to adjust the torque setting value, so that the rotation of the adjusting member 54 carries the transmission gear 53 to rotate, driving the moving member 51 to linearly move along the direction of the axis L1 with respect to the main body 1 toward the releasing member 31, thereby efficiently adjusting the resting member 52 from the lower limit position to the upper limit position; in other words, the position of the resting member 52 supporting the shaped supporting section 43 of the shaped elastic member 4 moves from the most distal end to the approximate middle section thereof, at which the torque setting value of the digitally displaying torque wrench 100 is set as the maximum. In such adjustment travel, because the second rotation radius R2 is larger than the first rotation radius R1, the user is able to efficiently complete the adjustment by rotating the adjusting member 54 for 1 to 2 rounds, achieving a quick and convenience of usage. Meanwhile, the releasing member 31 is at the first position; the adjusting member 54 is able to be rotated by the user to drive the moving member 51 for adjusting the position of the resting member 52 with respect to the shaped supporting section 43, achieving an efficient and easy adjustment of torque from the lower limit to the upper limit.

Then, referring to FIG. 9, the digitally displaying torque wrench 100 is wrenched. Because the torque setting value is set at the maximum, the bending deformation level of the shaped elastic member 4 from the fixing end 42 to the resting member 52 caused by the counterforce of the wrenching device 2 is smaller than the bending deformation level when the torque setting value is set at the minimum. When the wrenching force of the digitally displaying torque wrench 100 is larger than the setting value, as mentioned above, the releasing member 31 is disengaged with the pressing member 24 to stop the force transmission of the digitally displaying torque wrench 100, such that the wrenching member 20 and the actuating member 23 simultaneously hit the first inner wall 121*a* and the second inner wall 121*b*, respectively, thereby providing an obvious mechanical torque disengagement sensation to the user and reminding the user to stop imposing the force. Similarly, a buffer effect is provided to resolve the excessive force imposing by the user due to a wrenching inertia when the wrenching force of the fastener reaches the predetermined torque value, preventing the fastener from being excessively imposed with the torque and achieving a more accurate wrenching operation. Also, the releasing member 31 is at the second position. The shaped elastic member 4 enables the torque releasing device 3 to provide the force for the wrenching device 2 to be recovered to the original status. To be restored to the position as shown in FIG. 4 and FIG. 5A, it only needs to follow the aforementioned adjustment operation, the present invention also achieves a quick and simple torque adjustment from the upper limit to the lower limit.

Referring to FIG. 2, FIG. 3, and FIG. 10, the curve contact area 431 of the shaped supporting section 43 of the shaped elastic member 4 is applied for the resting member 52 to rest thereon. When the resting member 52 rests upon different positions on the curve contact area 431, the shaped elastic member 4 is allowed to generate different deformation degrees, which is determined by the counterforce of the wrenching device 2. Further, as shown by FIG. 10, a torque/distance curve of the present invention and a conventional art straight stick type (elastic stick) are illustrated. The distance in the torque/distance curve represents the position of the resting member 52 with respect to the shaped supporting section 43, which approximately ranges from 0 mm to 37.5 mm. In this distance range, the torque/distance curve of the present invention is presented in an approximate straight line, and that of the conventional art is presented in an arc line. It is clear that, with the shape of the curve contact area 431, the torque/distance curve of the present invention is presented in an approximate straight line, which is beneficial for the equidistant point selection of digitization, thereby improving the overall torque accuracy of the digitally displaying torque wrench 100, achieving a high precision purpose.

Referring to FIG. 11, the second embodiment of the present invention is illustrated. The similarities with the first embodiment are not repeated, and the difference lies in that the torque sensing device 6 comprises a sensed member 67. The sensed member 67 is disposed on the moving member 51 to displace along with it, and the sensing member 64 senses the displacement variation of the sensed member 67 in a non-contact manner to generate the torque signal, according to which the displayer 65 displays the corresponding torque setting value. Therein, the sensing manner between the sensing member 64 and the sensed member 67 is allowed to be light sensing or magnetic field sensing. If the sensing manner is light sensing, the sensing member 64 is allowed to include light emitting and light receiving function, and the sensed member 67 comprises a grating structure. If the sensing manner is magnetic field sensing, the sensing member 64 is a magnetic sensor, and the sensed member 67 is a magnet.

Referring to FIG. 12, the third embodiment of the present invention is illustrated. The similarities with the first embodiment are not repeated, and the difference lies in that the wrenching device 2 comprises a wrenching member 20 and a pressing member 24. The wrenching member 20 is pivotally disposed on the first end 10 of the main body 1. The wrenching member 20 comprises the wrenching end 2*a* exposed from the main body 1 and the distal end 204 inserted into the main body 1, wherein a first limiting portion 208 is disposed on one side of the distal end 204 of the wrenching member 20. The pressing member 24 is pivotally disposed on the distal end 204 by a connection pin 244. The releasing member 31 of the torque releasing device 3 is pivotally disposed in the main body 1 and optionally abuts against the pressing member 24. Further, the pressing member 24 comprises the second limiting portion 242, and the second limiting portion 242 and the first limiting portion 208 are allowed to abut against each other for limiting the swaying degree of the pressing member 24. Also, the recovering member 27 is disposed between the distal end 204 and the pressing member 24. The recovering member 27 normally maintains the abutting status between the pressing member 24 and the releasing member 31 of the torque releasing device 3. Therefore, in this embodiment, the torque adjusting device 5 is still allowed to be efficiently adjusted along the axis L1 of the main body 1, so as to adjust the axial position of the resting member 52 with respect to the shaped supporting section 43, thereby achieving a quick adjustment of the torque. This example is structurally simple, so as to be advantageous for miniaturization and suitable for small torque application fields.

With the foregoing configuration, the present invention achieves following advantages.

1. With the linking relationship of the wrenching member 20, the linkage bar 21, and the actuating member 23, the wrench of the present invention provides a mechanical torque disengagement function, such that when the torque releasing device 3 stops the force imposing of the wrench, the wrenching member 20 and the actuating member 23 hit the inner wall 121 of the main body 1, thereby providing an obvious mechanical torque disengagement sensation to the user and reminding the user to stop imposing the force; also, a buffer effect is provided to resolve the excessive force imposed by the user due to an wrenching inertia when the wrenching force of the fastener reaches the predetermined torque value, preventing the fastener from being excessively imposed with the torque and achieving a more accurate wrenching operation.

2. The shaped elastic member 4 of the present invention is disposed in the main body 1 in a tilt arrangement. When the tilt angle A of the shaped elastic member 4 increases, the abutting degree of the torque releasing device 3 and the wrenching device 2 is improved, so as to increase the upper limit of the torque setting value, thereby increasing the range of the torque setting value suitable for high torque demand working fields.

3. The torque adjusting device 5 of the present invention is allowed to be efficiently adjusted along the axis L1 of the main body 1, so as to change the axial position of the resting member 52 with respect to the shaped elastic member 4, achieving the adjustment of the upper limit or lower limit of the torque setting value. The adjustment method of the present invention is fast and simple, saving time and effort, and the adjusted torque setting value is immediately displayed on the displayer 65, allowing the user to be aware of the current torque setting value right away.

The aforementioned embodiments are only used to illustrate the present invention, instead of limiting the scope of the present invention. All modifications or changes not violating the ideas of the present invention belong to the claimed patent scope of the present invention.

What is claimed is:

1. A digitally displaying torque wrench with mechanical torque adjustment, comprising:

a main body forming a first end and a second end away from the first end along an axis, the axis dividing the main body into a forward side and a reverse side, the main body comprising an inner wall, the inner wall comprising a first inner wall on the reverse side and a second inner wall on the forward side;

a wrenching device swayable and disposed on the first end of the main body, the wrenching device comprising a wrenching member, a linkage bar, and an actuating member, the wrenching member pivotally disposed on the first end and comprising a wrenching end exposed from the main body and a distal end inserted into the main body, the linkage bar comprising a first combining end and an opposite second combining end, the first combining end pivotally disposed on the distal end, the actuating member pivotally disposed in the main body and operable between a first pivot position and a second pivot position, whereby the actuating member is linked with the second combining end;

a torque releasing device pivotally disposed in the main body and optionally abutting against one end of the wrenching device away from the wrenching end, and the torque releasing device abutting against the actuating member;

a shaped elastic member comprising a fixing end, and the fixing end of the shaped elastic member fixed to the torque releasing device;

a torque adjusting device disposed in the main body and movable along a direction in parallel to the axis of the main body to generate a relative sliding relationship, the torque adjusting device comprising a resting member upon which one end of the shaped elastic member away from the fixing end rests, the torque adjusting device being operable by a user to adjust an axial position of the resting member with respect to the shaped elastic member; and a torque sensing device disposed on a position of the main body corresponding to the torque adjusting device, the torque sensing device configured to sense a displacement variation of the torque adjusting device and display a torque setting value; when the actuating member is at the first pivot position, the actuating member transmits a counterforce of the wrenching device to the shaped elastic member; when the torque releasing device is disengaged, a force transmission of the digitally displaying torque wrench is stopped; and when the actuating member sways to the second pivot position, the actuating member carries the linkage bar to displace with respect to the main body and simultaneously actuates the wrenching member to hit the first inner wall while the actuating member hits the second inner wall.

2. The digitally displaying torque wrench with mechanical torque adjustment of claim 1, wherein the wrenching member comprises a first hitting face on one side of the distal end, and a first hitting space is formed between the first hitting face and the first inner wall; the actuating member comprises a second hitting face on one side thereof, and a second hitting space is formed between the second hitting face and the second inner wall; when the torque releasing device stops a force imposing of the digitally displaying torque wrench, the first hitting face enters the first hitting space and hits the first inner wall, and the second hitting face enters the second hitting space and hits the second inner wall.

3. The digitally displaying torque wrench with mechanical torque adjustment of claim 2, wherein when the digitally displaying torque wrench is in a normal status, an axial center line of the linkage bar and the axis include a first angle, the second hitting face and the axis include an impact angle, and the second combining end of the linkage bar is arranged on the reverse side; when the torque releasing device stops the force imposing of the digitally displaying torque wrench, the axial center line of the linkage bar and the axis include a second angle, the first angle is larger than the second angle, the first angle is larger than the impact angle, and the first combining end of the linkage bar is allowed to cross over the axis of the main body to the reverse side of the main body, so that the first combining end and the second combining end are both on the reverse side of the main body.

4. The digitally displaying torque wrench with mechanical torque adjustment of claim 3, wherein an actuating end is disposed on one end of the actuating member away from the linkage bar; the torque releasing device comprises a releasing member; a pressing member is pivotally disposed on the wrenching device in opposite to the wrenching end; the pressing member has one side linked with the actuating end and another side resting upon the releasing member; when the force imposed wrenching the digitally displaying torque wrench increases to be equal to the torque setting value, the releasing member is disengaged with the pressing member, so as to stop the force imposing of the digitally displaying torque wrench; when the digitally displaying torque wrench is recovered to the normal status, the releasing member and the pressing member are automatically restored to an original abutting status; the pressing member comprises a first abutting portion, and one side of the releasing member away from the shaped elastic member comprises a second abutting portion to abut against the first abutting portion.

5. The digitally displaying torque wrench with mechanical torque adjustment of claim 4, wherein a recovering member is disposed between the actuating end of the actuating member and the pressing member; the recovering member normally maintains the abutting status of the pressing member and the releasing member; a bias spring is disposed between the wrenching member and the inner wall of the main body to provide a force for the wrenching member to be recovered to a normal status; the wrenching device further comprises two clamp boards; the second combining end of the linkage bar is pivotally disposed on one side of the two clamp boards, the pressing member is pivotally disposed on another side of the two clamp boards, and the actuating member is pivotally disposed between the two clamp boards; the actuating end of the actuating member comprises a first limiting portion, and the pressing member comprises a corresponding second limiting portion, wherein the first limiting portion and the second limiting portion are allowed to abut against each other, so as to limit a swaying degree of the pressing member.

6. The digitally displaying torque wrench with mechanical torque adjustment of claim 5, wherein the torque adjusting device comprises a moving member, a transmission gear, and an adjusting member; the moving member is slidably disposed in the main body along the direction of the axis, and the resting member is rotatably disposed in the moving member; the moving member comprises a first tooth portion disposed along the direction in parallel to the axis, the transmission gear comprises a second tooth portion, the second tooth portion is engaged with the first tooth portion, and the adjusting member is connected with the transmission gear, such that the user rotates the adjusting member to carry the moving member to generate a linear displacement with respect to the main body and adjust a position of the resting member with respect to the shaped elastic member; the adjusting member is rotatably disposed on the main body along a direction of a rotation axis in perpendicular to the axis, and the second tooth portion is disposed about the rotation axis; the main body comprises a containing space, and a guiding portion is disposed in the containing space; the moving member is slidably disposed in the main body along the guiding portion; the transmission gear defines a first rotation radius, the second tooth portion is disposed along the first rotation radius, the adjusting member defines a second rotation radius, the second rotation radius is larger than the first rotation radius, and the transmission gear and the adjusting member are disposed in a coaxial arrangement.

7. The digitally displaying torque wrench with mechanical torque adjustment of claim 6, wherein the torque sensing device comprises a sensing member and a displayer; the displayer is electrically connected with the sensing member, the sensing member comprises a movable portion, and the movable portion is connected with the moving member to move along with it, such that the sensing member senses a displacement variation of the moving member to generate a torque signal, and the displayer displays the torque setting value according to the torque signal.

8. The digitally displaying torque wrench with mechanical torque adjustment of claim 7, wherein the main body comprises a sensing hole in communication with the containing space, and the sensing member senses the displacement variation of the moving member through the sensing hole; the torque sensing device further comprises a casing and a circuit board, a power source, and a counter disposed on the casing; the displayer, the sensing member, the power source, and the counter are electrically connected with the circuit board; the counter is configured to, according to an amount of disengagement between the releasing member and the pressing member, send a counter signal to be displayed on the displayer; the wrenching device comprises a driver, the wrenching end is disposed on the driver, and the driver is removably disposed on the wrenching member; the torque sensing device further comprises a wireless transmission unit, which transmits the torque signal and the counter signal to a portable device; the main body further comprises a handle mounted around the second end.

9. The digitally displaying torque wrench with mechanical torque adjustment of claim 6, wherein the torque sensing device comprises a sensing member, a sensed member, and a displayer; the displayer is electrically connected with the sensing member, and the sensed member is disposed on the moving member to move along with it, such that the sensing member senses a displacement variation of the sensed member in a non-contact sensing manner to generate a torque signal, and the displayer displays the torque setting value according to the torque signal.

10. A digitally displaying torque wrench with mechanical torque adjustment, comprising:

- a main body forming a first end and a second end away from the first end along an axis, the axis dividing the main body into a forward side and a reverse side;
- a wrenching device swayable and disposed on the first end of the main body, the wrenching device comprising a wrenching end exposed from the main body;
- a torque releasing device pivotally disposed in the main body and optionally abutting against one end of the wrenching device away from the wrenching end;
- a shaped elastic member comprising a fixing end, and the fixing end of the shaped elastic member fixed to the torque releasing device; the shaped elastic member comprising a shaped supporting section on one end thereof away from the fixing end, the shaped supporting section comprising a curve contact area, the shaped elastic member disposed in the main body and tilting with respect to the axis of the main body, an axial center line of the shaped elastic member including a tilt angle with the axis, the fixing end of the shaped elastic member arranged on the reverse side of the main body, the shaped supporting section of the shaped elastic member allowed to cross over the axis of the main body to the forward side of the main body;
- a torque adjusting device disposed in the main body and movable along a direction in parallel to the axis of the main body to generate a relative sliding relationship, the torque adjusting device comprising a resting member upon which the curve contact area of the shaped supporting section rests, the torque adjusting device being operable by a user to adjust an axial position of the resting member with respect to the shaped supporting section, so as to change the tilt angle of the shaped elastic member with respect to the main body; and
- a torque sensing device disposed on a position of the main body corresponding to the torque adjusting device, the torque sensing device configured to sense a displacement variation of the torque adjusting device and display a torque setting value; when the resting member of the torque adjusting device rests upon the position on the shaped elastic member away from the fixing end, the torque setting value is set at the minimum;
- when the resting member of the torque adjusting device rests upon the position on the shaped elastic member in adjacent to the fixing end, the torque setting value is set at the maximum.

11. The digitally displaying torque wrench with mechanical torque adjustment of claim 10, wherein the curve contact area is formed in a shape which is thinner on two ends and thicker in the middle, so that a torque/distance curve of the digitally displaying torque wrench is presented in an approximate straight line.

12. The digitally displaying torque wrench with mechanical torque adjustment of claim 11, wherein the torque releasing device comprises a releasing member; a pressing member is pivotally disposed on the wrenching device in opposite to the wrenching end; the pressing member rests upon the releasing member; when the force imposed wrenching the digitally displaying torque wrench increases to be equal to the torque setting value, the releasing member is disengaged with the pressing member, so as to stop the force imposing of the digitally displaying torque wrench; when the digitally displaying torque wrench is recovered to the normal status, the releasing member and the pressing member are restored to an original abutting status; the pressing member comprises a first abutting portion, and one side of the releasing member away from the shaped elastic member comprises a second abutting portion to abut against the first abutting portion; adjusting the axial position of the resting member with respect to the shaped supporting section changes a contact area between the first abutting portion and the second abutting portion.

13. The digitally displaying torque wrench with mechanical torque adjustment of claim 12, wherein a recovering member is disposed between the wrenching device and the pressing member; the recovering member normally maintains the abutting status of the pressing member and the releasing member; a bias spring is disposed between the wrenching device and an inner wall of the main body to provide a force for the wrenching device to be recovered to a normal status; the wrenching device comprises a first limiting portion away from the wrenching end, and the pressing member comprises a corresponding second limiting portion, wherein the first limiting portion and the second limiting portion are allowed to abut against each other, so as to limit the swaying degree of the pressing member.

14. The digitally displaying torque wrench with mechanical torque adjustment of claim 13, wherein the torque adjusting device comprises a moving member, a transmission gear, and an adjusting member; the moving member is slidably disposed in the main body along the direction of the axis, and the resting member is rotatably disposed in the moving member; the moving member comprises a first tooth portion disposed along the direction in parallel to the axis, the transmission gear comprises a second tooth portion, the second tooth portion is engaged with the first tooth portion, and the adjusting member is connected with the transmission gear, such that the user rotates the adjusting member to carry the moving member to generate a linear displacement with respect to the main body and adjust a position of the resting member with respect to the shaped supporting section; the adjusting member is rotatably disposed on the main body along a direction of a rotation axis in perpendicular to the axis, and the second tooth portion is disposed about the rotation axis; the main body comprises a containing space, and a guiding portion is disposed in the containing space; the moving member is slidably disposed in the main body along the guiding portion; the transmission gear defines a first rotation radius, the second tooth portion is disposed along the first rotation radius, the adjusting member defines a second rotation radius, the second rotation radius is larger than the first rotation radius, and the transmission gear and the adjusting member are disposed in a coaxial arrangement.

15. The digitally displaying torque wrench with mechanical torque adjustment of claim 14, wherein the torque sensing device comprises a sensing member and a displayer; the displayer is electrically connected with the sensing member, the sensing member comprises a movable portion, and the movable portion is connected with the moving member to move along with it, such that the sensing member senses a displacement variation of the moving member to generate a torque signal, and the displayer displays the torque setting value according to the torque signal.

16. The digitally displaying torque wrench with mechanical torque adjustment of claim 15, wherein the main body comprises a sensing hole in communication with the containing space, and the sensing member senses the displacement variation of the moving member through the sensing hole; the torque sensing device further comprises a casing and a circuit board, a power source, and a counter disposed on the casing; the displayer, the sensing member, the power source, and the counter are electrically connected with the circuit board; the counter is configured to, according to an amount of disengagement between the releasing member and the pressing member, send a counter signal to be displayed on the displayer; the wrenching device comprises a wrenching member and a driver, the wrenching end is disposed on the driver, and the driver is removably disposed on the wrenching member; the torque sensing device further comprises a wireless transmission unit, which transmits the torque signal and the counter signal to a portable device; the main body further comprises a handle mounted around the second end.

17. The digitally displaying torque wrench with mechanical torque adjustment of claim 14, wherein the torque sensing device comprises a sensing member, a sensed member, and a displayer; the displayer is electrically connected with the sensing member, and the sensed member is disposed on the moving member to move along with it, such that the sensing member senses a displacement variation of the sensed member in a non-contact sensing manner to generate a torque signal, and the displayer displays the torque setting value according to the torque signal.

18. A digitally displaying torque wrench with mechanical torque adjustment, comprising:

a main body forming a first end and a second end away from the first end along an axis, the axis dividing the main body into a forward side and a reverse side;

a wrenching device swayable and disposed on the first end of the main body, the wrenching device comprising a wrenching member and a pressing member, the wrenching member pivotally disposed on the first end, the wrenching member comprising a wrenching end exposed from the main body and a distal end inserted into the main body, the pressing member pivotally disposed on the distal end;

a torque releasing device pivotally disposed in the main body and optionally abutting against the pressing member;

a shaped elastic member comprising a fixing end, and the fixing end of the shaped elastic member fixed to the torque releasing device; the shaped elastic member comprising a shaped supporting section on one end thereof away from the fixing end, the shaped supporting section comprising a curve contact area, the shaped elastic member disposed in the main body and tilting with respect to the axis of the main body, an axial center line of the shaped elastic member including a tilt angle with the axis, the fixing end of the shaped elastic member arranged on the reverse side of the main body, the shaped supporting section of the shaped elastic member allowed to cross over the axis of the main body to the forward side of the main body;

a torque adjusting device disposed in the main body and movable along a direction in parallel to the axis of the main body to generate a relative sliding relationship, the torque adjusting device comprising a resting member upon which the curve contact area of the shaped supporting section rests, the torque adjusting device being operable by a user to adjust an axial position of the resting member with respect to the shaped supporting section, so as to change the tilt angle of the shaped elastic member with respect to the main body; and a torque sensing device disposed on a position of the main body corresponding to the torque adjusting device, the torque sensing device configured to sense a displacement variation of the torque adjusting device and display a torque setting value; when the resting member of the torque adjusting device rests upon the position on the shaped elastic member away from the fixing end, the torque setting value is set at the minimum; when the resting member of the torque adjusting device rests upon the position on the shaped elastic member in adjacent to the fixing end, the torque setting value is set at the maximum; when a force imposed wrenching the digitally displaying torque wrench increases to be equal to the torque setting value, the torque releasing device is disengaged with the pressing member, so as to stop the force imposing of the digitally displaying torque wrench; when the digitally displaying torque wrench is recovered to a normal status, the torque releasing device and the pressing member are restored to an original abutting status.

19. The digitally displaying torque wrench with mechanical torque adjustment of claim 18, wherein the curve contact area is formed in a shape which is thinner on two ends and thicker in the middle, so that a torque/distance curve of the digitally displaying torque wrench is presented in an approximate straight line; a first limiting portion is disposed on one side of the distal end, the pressing member comprises a corresponding second limiting portion, wherein the first limiting portion and the second limiting portion are allowed to abut against each other, so as to limit the swaying degree of the pressing member; a recovering member is disposed between the distal end and the pressing member; the recovering member normally maintains the abutting status of the pressing member and the torque releasing device; a bias spring is disposed between the wrenching member and an inner wall of the main body to provide a force for the wrenching member to be recovered to a normal status.

* * * * *